US012097153B2

(12) United States Patent
Furman et al.

(10) Patent No.: US 12,097,153 B2
(45) Date of Patent: Sep. 24, 2024

(54) BATTERY MANAGEMENT FOR PATIENT SUPPORT APPARATUSES

(71) Applicant: Stryker Corporation, Kalamazoo, MI (US)

(72) Inventors: Aaron Douglas Furman, Kalamazoo, MI (US); Daniel Vincent Brosnan, Kalamazoo, MI (US); Lavanya Vytla, McKinney, TX (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/385,023

(22) Filed: Oct. 30, 2023

(65) Prior Publication Data

US 2024/0058189 A1 Feb. 22, 2024

Related U.S. Application Data

(63) Continuation of application No. 17/854,043, filed on Jun. 30, 2022, now Pat. No. 11,801,178, which is a (Continued)

(51) Int. Cl.
*A61G 7/018* (2006.01)
*A61G 7/005* (2006.01)
(Continued)

(52) U.S. Cl.
CPC ............. *A61G 7/018* (2013.01); *A61G 7/005* (2013.01); *A61G 7/015* (2013.01); *A61G 7/0506* (2013.01); *A61G 7/0514* (2016.11); *A61G 7/0524* (2016.11); *G05F 1/66* (2013.01); *A61G 1/017* (2013.01); *A61G 1/02* (2013.01); *A61G 13/04* (2013.01); *A61G 13/08* (2013.01); *A61G 13/104* (2013.01); *A61G 2203/16* (2013.01); *A61G 2203/20* (2013.01)

(58) Field of Classification Search
CPC ........ A61G 7/018; A61G 7/005; A61G 7/015; A61G 7/0506; A61G 7/0514; A61G 7/0524; A61G 13/04; G05F 1/66
See application file for complete search history.

(56) References Cited

U.S. PATENT DOCUMENTS 5,422,559 A * 6/1995 Hall .................. H02J 7/007182 320/164
2016/0331614 A1* 11/2016 Furman ..................... G05F 1/66

* cited by examiner

*Primary Examiner* — Fredrick C Conley
(74) *Attorney, Agent, or Firm* — Warner Norcross + Judd LLP

(57) ABSTRACT

A patient support apparatus, such as a bed, recliner, cot, stretcher, operating table, or the like, includes battery-powered circuitry whose functions are reduced, but not eliminated, as the battery charge level falls below a threshold. Electrical power may be cut off to one or more components of the battery-powered circuitry while still providing battery-supplied electrical power to the other components of the circuitry. A user interface provides battery status data, including a replacement status of a rechargeable battery, and allows a user to select different formats for displaying battery status data. Such formats include displays of battery charge level information not only in manners specific to the battery, but also in manners relative to the patient support apparatus, such as displays of how many, or how much of, one or more functions the patient support apparatus is able to perform based on the battery's current charge level.

20 Claims, 10 Drawing Sheets

Related U.S. Application Data continuation of application No. 16/549,572, filed on Aug. 23, 2019, now Pat. No. 11,399,997, which is a continuation of application No. 15/151,523, filed on May 11, 2016, now Pat. No. 10,420,687.

(60) Provisional application No. 62/160,155, filed on May 12, 2015.

(51) Int. Cl.

| | |
|---|---|
| ***A61G 7/015*** | (2006.01) |
| ***A61G 7/05*** | (2006.01) |
| ***G05F 1/66*** | (2006.01) |
| *A61G 1/017* | (2006.01) |
| *A61G 1/02* | (2006.01) |
| *A61G 13/04* | (2006.01) |
| *A61G 13/08* | (2006.01) |
| *A61G 13/10* | (2006.01) |

BATTERY MANAGEMENT FOR PATIENT SUPPORT APPARATUSES

CROSS-REFERENCE TO RELATED APPLICATIONS

This application claims priority to U.S. patent application Ser. No. 17/854,043 filed Jun. 30, 2022, by inventors Aaron Furman et al. and entitled BATTERY MANAGEMENT FOR PATIENT SUPPORT APPARATUSES, which in turn claims priority to U.S. patent application Ser. No. 16/549,572 filed Aug. 23, 2019, by inventors Aaron Furman et al. and entitled BATTERY MANAGEMENT FOR PATIENT SUPPORT APPARATUSES, which in turn claims priority to U.S. patent application Ser. No. 15/151,523 filed May 11, 2016, by inventors Aaron Furman et al. and entitled BATTERY MANAGEMENT FOR PATIENT SUPPORT APPARATUSES, which in turn claims priority to U.S. provisional patent application Ser. No. 62/160,155 filed May 12, 2015 by inventors Aaron Furman et al. and entitled BATTERY MANAGEMENT FOR PATIENT SUPPORT APPARATUSES, the complete disclosures of all of which are hereby incorporated herein by reference.

BACKGROUND

The present disclosure relates to patient care devices, such as patient thermal temperature management systems, as well as patient support apparatuses, such as beds, cots, stretchers, recliners, and the like.

Patient care devices often employ one or more batteries that provide electrical power for carrying out their functions. Often, the user of the patient care device is given little information about the state of the battery, other than how charged it currently is. Existing patient care devices may also not take steps to better manage the battery, given its current charge state and/or its overall health.

SUMMARY

According to some embodiments, the present disclosure relates to patient care devices that are designed to include one or more of the following features: provide more efficient usage of the battery, convey better information regarding the state of the battery, facilitate proper maintenance of the battery, and better conserve the battery's power. In some embodiments, the patient care devices include a sleep state that cuts off power to all instruction-executing processors in the device, and/or the devices include automatic power conservation steps that are taken before the battery is drained, and/or the devices include improvements in the display of battery status information that better enable the user to make decisions about using the device while being powered by a battery.

According to one embodiment, a patient support apparatus is provided that includes a frame, wheels, a support surface, an actuator, a battery, and a control system. The support surface is adapted support a patient thereon and the actuator is adapted to move at least a portion of the support surface. The battery powers the actuator. The control system monitors a charge state of the battery, compares the charge state of the battery to a threshold and, when the charge state is lower than the threshold, disables movement of the actuator in a first manner but enables movement of the actuator in a second manner.

In some embodiments, the first manner includes moving the actuator in a first direction, and the second manner includes moving the actuator in a second direction opposite to the first direction. Still further, in some of such embodiments, the actuator controls a height of the support surface, and the first direction raises a height of the support surface and the second direction lowers a height of the support surface.

In other embodiments, the first manner includes moving the support surface to a Trendelenburg position and the second manner includes moving the support surface out of the Trendelenburg position. In still other embodiments, the first manner includes moving the support surface to a reverse Trendelenburg position and the second manner includes moving the support surface out of the reverse Trendelenburg position. In such embodiments, the patient support apparatus may be a bed or a stretcher.

In still other embodiments, the first manner includes moving the support surface to a first configuration and the second manner includes moving the support surface away from the first configuration. The first configuration may be an egress configuration adapted to allow the patient to exit the patient support apparatus more easily than when the patient support apparatus is in other configurations, while the second configuration is a configuration that does not allow the patient to exit the patient support apparatus as easily as the first configuration.

In still other embodiments, the patient support apparatus is a recliner having a seat, a backrest, a leg rest, a leg rest actuator, and a backrest actuator. In such embodiments, the control system is further adapted to disable movement of the leg rest actuator in a third manner but enable movement of the leg rest actuator in a fourth manner when the charge state is lower than the threshold, and to disable movement of the backrest actuator in a fifth manner but enable movement of the backrest actuator in a sixth manner when the charge state is lower than the threshold. The third and fifth manners may include moving the support surface to a first configuration and the fourth and sixth manners may include moving the support surface away from the first configuration.

According to another embodiment, a patient support apparatus is provided that includes a frame, wheels, a support surface, a battery, and a control system. The support surface is adapted to support a patient thereon and the battery is adapted to power a component of the patient support apparatus. The control system monitors a replacement status of the battery, compares the replacement status of the battery to a first threshold and to a second threshold, provides an indication to a user that the battery should be replaced when the replacement status is between the first and second thresholds, and stops supplying power to the component when the replacement status is smaller than the first threshold.

In other embodiments, the control system stops supplying power to the component when the replacement status is smaller than the first threshold even if the battery still includes sufficient charge to power an actuator.

In some embodiments, the replacement status of the battery is a number calculated from a formula. The formula may take into account an age of the battery since installation in the patient support apparatus, a cumulative number of times the battery has been re-charged, and/or a ratio of a current charge capacity of the battery compared to a previous charge capacity of the battery (such as the charge capacity when the battery was initially installed in the patient support apparatus).

In another embodiment, the patient support apparatus includes a second component and the control system is further adapted to stop supplying power to the second component when the replacement status is smaller than the first threshold and the second component is activated in a particular manner. The particular manner refers to moving the actuator in a first direction, but not a second direction opposite to the first direction, in at least some embodiments.

According to another embodiment, a patient support apparatus is provided that includes a frame, wheels, a support surface, a plurality of components powered by a battery, a display, and a control system. The control system monitors a current charge state of the battery and displays both a first indication and a second indication on the display. The first indication indicates a first relationship of the current charge state of the battery to a first set of the plurality of components and the second indication indicates a second relationship of the current charge state of the battery to a second set of the components.

In some embodiments, the first set of components includes a motor for driving a first one of the wheels and the second set of components includes an actuator for changing a height of the support surface. The first indication may provide an estimated distance the motor can drive the patient support apparatus based on the current charge state of the battery. The second indication may provide an estimated number of times the height of the support surface can be changed before the battery should be recharged.

In some embodiments, the second set is a subset of the first set.

Still further, in some embodiments, the patient support apparatus is a cot, the first set of the plurality of components includes an actuator to lift the support surface from a lowered position to a raised position, and the first indication provides an estimated number of lifts that can be powered by the battery until the battery should be recharged. The second indication may provide an estimated amount of time before the battery should be recharged.

In some embodiments, the control system automatically switches between displaying the first indication and displaying the second indication depending upon a state of the patient support apparatus. For example, in some embodiments, the patient support apparatus includes a propulsion system adapted to be activated by a user, and the control system automatically displays the first indication when the propulsion system is activated and automatically displays the second indication when the propulsion system is not activated. The first indication may indicate an estimated distance the propulsion system can propel the patient support apparatus before the battery should be recharged, and the second indication may provide an estimated amount of time before the battery should be recharged.

According to another embodiment, a patient support apparatus is provided that includes a frame, wheels, a support surface, a battery, a display, a control system, and a user interface. The control system monitors a current charge state of the battery and the user interface allows a user to select between displaying first or second indications of the charge state of the battery on the display.

In some embodiments, the first indication provides an estimate of a capacity of the battery and the second indication provides an estimated percentage of a remaining life of the battery before the battery should be replaced. The estimated percentage is based at least partially upon a cumulative number of discharge cycles experienced by the battery, in some embodiments.

In other embodiments, the first indication provides an estimate of a number of motion cycles of the support surface, or an estimate of time until the battery runs out. When providing an estimate of time, the time estimate may be based upon a current rate of usage of the battery and may change if the current rate of usage of the battery changes. In some embodiments, the control system maintains a history of the estimate of time and displays at least a portion of the history of the estimate of time.

In still other embodiments, the first indication provides an indication of when the battery should be replaced, such as an estimated percentage of a remaining life of the battery until it should be replaced.

The patient support apparatus may be a cot having an actuator adapted to lift the support surface from a lowered position to a raised position, wherein the first indication provides an estimated number of lifts that can be powered by the battery until the battery should be recharged. Alternatively, the patient support apparatus may include a propulsion system wherein the first indication indicates an estimated distance the propulsion system can propel the patient support apparatus before the battery should be recharged. In such embodiments, the first indication may include a map of at least a portion of a healthcare facility, wherein the map is marked to graphically identify which locations lie within the estimated distance.

The display displays a speed of the patient support apparatus, in some embodiments.

The second indication may indicate a level of power currently being delivered by the battery to the patient support apparatus.

In still other embodiments, the patient support apparatus includes an exit detection system adapted to detect, when activated, if the patient is about to exit the support surface, and the first indication provides an estimate amount of time the exit detection system can remain activated before the battery should be recharged.

The control system is adapted, in some embodiments, to change the patient support apparatus from an awake state to a sleep state when the control system detects inactivity for more than a threshold amount of time, the sleep state consuming less power than the awake state. In the sleep state, the control system shuts off electrical power to all microcontrollers on the patient support apparatus. Circuitry is provided to awaken the patient support apparatus from the sleep state, and the circuitry is implemented completely in hardware and utilizes no software.

A voltage monitor is included in some embodiments that is adapted to monitor a voltage of the battery both when the patient support apparatus is in the sleep state and when the patient support apparatus is in the awake state. The voltage monitor shuts off power to all electrical components of the patient support apparatus when the voltage monitor detects that a voltage of the battery has fallen below a voltage threshold and the patient support apparatus is not plugged into an electrical power outlet. The voltage monitor turns on power to at least some of the electrical components of the patient support apparatus only when the patient support apparatus receives electrical power having a voltage greater than the voltage threshold.

According to still another embodiment, a patient support apparatus is provided that includes a frame, wheels, a support surface, a battery, a display, a control system, and an interface. The control system monitors a current charge state of the battery. The interface includes a plurality of relays in electrical communication with a connector that are adapted to receive a nurse call cable. The control system changes a state of one or more of the relays when the control system detects that the charge state of the battery has fallen below a threshold, thereby providing an indication to a conventional nurse call system that the battery of the patient support apparatus has fallen below the threshold.

The patient support apparatus may also include includes an exit detection system wherein the control system changes the state of the same relay, or a different relay, when the exit detection system detects that the patient is about to exit the support surface. The control system may also change the state of yet another relay when the control system detects that the charge state of the battery has fallen below a second threshold that is lower than the threshold. In some embodiments, the controller retains the relay in the changed state even when electrical power is no longer supplied to the control system.

According to still another embodiment, a patient support apparatus is provided that includes a frame, wheels, a support surface, an actuator, a battery, and a control system. The control system includes a microcontroller for controlling the actuator and a voltage monitor for monitoring a voltage level of the battery. The control system terminates power to the microcontroller if the voltage level of the battery drops below a threshold and allows power to flow to the microcontroller if the voltage level of the battery is above the threshold.

The patient support apparatus may also include a user interface wherein the control system terminates power to the user interface if the voltage level of the battery drops below the threshold. In some embodiments, the control system further includes a sleep circuit adapted to change the patient support apparatus from an awake state to a sleep state if the control system detects inactivity for more than a threshold amount of time. The sleep state consumes less power than the awake state. The control system terminates power to the microcontroller while the patient support apparatus is in the sleep state, and supplies power to the microcontroller while the patient support apparatus is in the awake state provided the voltage level of the battery exceeds the threshold. Circuitry adapted to awaken the patient support apparatus from the sleep state to the awake state is also included, and in some embodiments this circuitry is implemented completely in hardware and utilizes no software.

The control system, in some embodiments, shuts off power to all electrical components of the patient support apparatus when the voltage monitor detects that the voltage level of the battery has fallen below a second threshold lower than the threshold and the patient support apparatus is not plugged into an electrical power outlet. The control system also turns on power to at least some of the electrical components of the patient support apparatus only when the patient support apparatus receives electrical power having a voltage greater than the threshold. The control system may continue to supply power to a wake circuit while the battery is below the threshold but above a second threshold. The wake circuit resupplies power to the microcontroller when the wake circuit is activated. In some embodiments, the wake circuit is coupled to a user interface, and the wake circuit is activated when a user touches the user interface.

In any of the above-described embodiments, the patient support apparatus may be a recliner having a seat, a backrest, and a leg rest, or it may be a bed or stretcher having a movable patient support surface.

Before the various embodiments disclosed herein are explained in detail, it is to be understood that the claims are not to be limited to the details of operation, to the details of construction, or to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of “including” and “comprising” and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
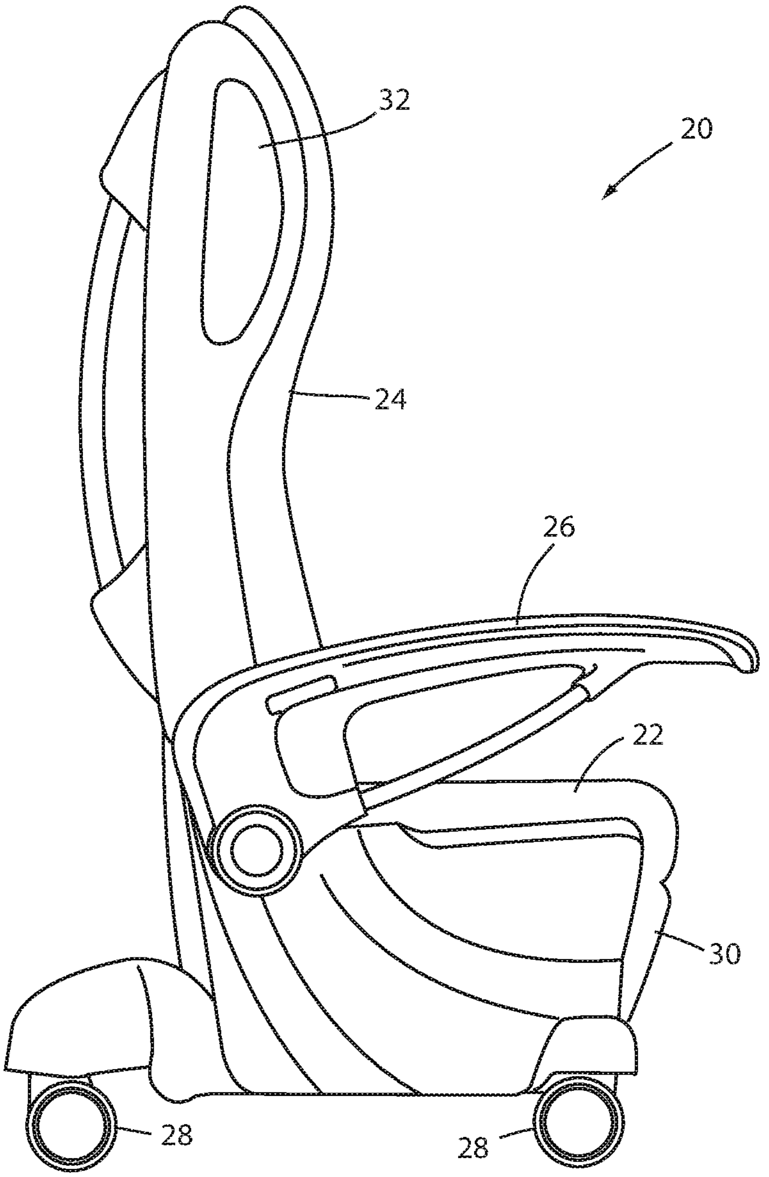
FIG. 1 is a side elevation view of a first patient support apparatus embodying various aspects of the present disclosure.
Figure 2:
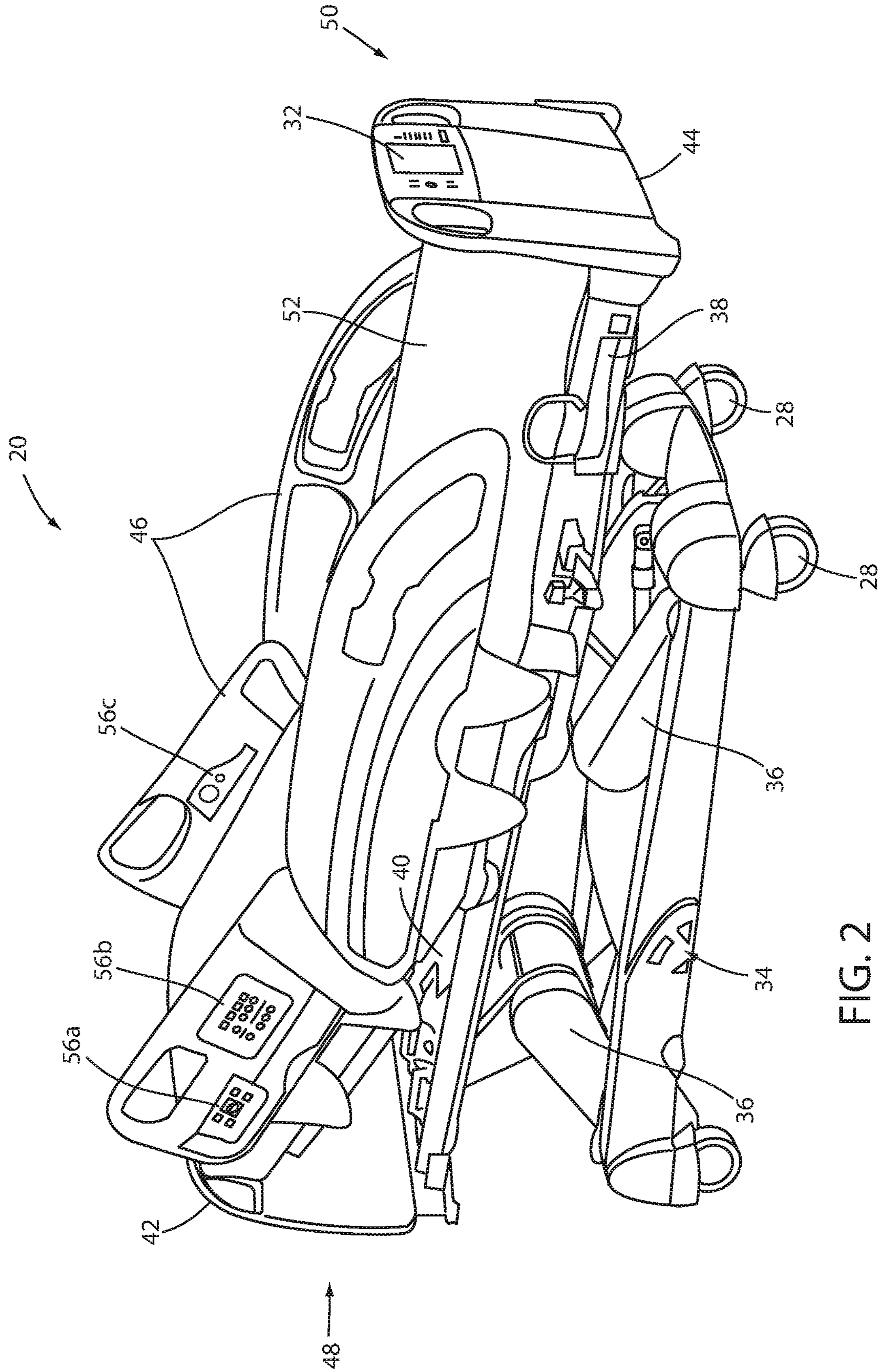
FIG. 2 is a perspective view of a second patient support apparatus embodying various aspects of the present disclosure.

A patient support apparatus 20 according to one embodiment of the present disclosure is shown in FIG. 1. Patient support apparatus 20, as shown in FIG. 1, is implemented as a recliner. It will be understood, however, that patient support apparatus 20 can be alternatively implemented as a bed, such as shown in FIG. 2. In still other embodiments, patient support apparatus 20 may be implemented as a cot, a stretcher, or still other types of apparatuses that are capable of supporting a patient. Further, it will be understood that the embodiments of the present disclosure discussed herein can alternatively be incorporated into other types of patient care devices, such as, but not limited to, temperature management systems for controlling the temperature of patients. One such temperature management system is disclosed in commonly assigned U.S. patent application Ser. No. 14/282,383 filed May 20, 2014 by inventors Christopher J. Hopper et al. and entitled THERMAL CONTROL SYSTEM, the complete disclosure of which is hereby incorporated herein by reference.

Patient support apparatus 20 of FIG. 1 includes a support surface or seat 22, a backrest 24, an armrest 26, a plurality of wheels 28, an adjustable leg rest 30, and two touch screens 32 (one positioned on either side of patient support apparatus 20, with only one visible in FIG. 1). Backrest 24 is angularly adjustable with respect to seat 22 about a pivot axis that extends perpendicularly out of the plane of the page of FIG. 1 so that a patient seated on seat 22 can change how far he or she leans back on patient support apparatus 20. Leg rest 30 is also movable from a stowed position (shown in FIG. 1) to an extended position that supports a patient's legs in a substantially horizontal orientation. The movement and physical construction of patient support apparatus 20 of FIG. 1 may take on any of the forms disclosed in commonly assigned U.S. patent application Ser. No. 14/212,253 filed Mar. 14, 2014 by inventors Christopher Hough et al. and entitled MEDICAL SUPPORT APPARATUS, the complete disclosure of which is incorporated herein by reference.

The control of the movement of patient support apparatus 20 is carried out via the touch screens 32. Touch screen 32 includes a plurality of buttons, icons, images, and/or other types of controls that, when pressed, implement one or more functions associated with patient support apparatus 20. More specifically, such controls may include controls for moving seat 22, backrest 24, and/or leg rest 30; controls for activating and deactivating an exit detection system; controls for activating and deactivating a patient lockout function; and controls for carrying out still other functions.

A number of indicators may also be provided on touch screen 32 that are selectively illuminated, depending upon the state of patient support apparatus 20 and/or the state of one or more of the controls. For example, touch screen 32 may include one or more icons, images, graphics, or other types of indicia that provide one or more indications regarding the current state of a battery on board patient support apparatus 20. These indicia are discussed in greater detail below, including the number of such indicia that are displayed, the time at which the indicia are displayed, and the manual and/or automatic selection that is undertaken to determine which indicia to display.

FIG. 2 illustrates another example of a patient support apparatus 20 that may incorporate one or more features of the present disclosure. Patient support apparatus 20 of FIG. 2 is implemented as a bed and includes a base 34 having a plurality of wheels 28, a pair of lifts 36 supported on the base, a litter frame 38 supported on the lifts 36, and a support deck 40 supported on the litter frame 38. Patient support apparatus 20 of FIG. 2 further includes a headboard 42, a footboard 44, and a plurality of siderails 46. Siderails 46 are all shown in a raised position in FIG. 2 but are each individually movable to a lower position in which ingress into, and egress out of, patient support apparatus 20 is not obstructed by the lowered siderails 46.

Footboard 44 includes a first user interface 56 having a touch screen 32. Patient support apparatus 20 of FIG. 2 further includes a plurality of additional user interfaces 56, including first and second caregiver user interfaces 56*a* and 56*b* positioned on the outside faces of head end siderails 46, as well as a patient user interface 56*c* positioned on the inside faces of head end siderails 46. Although user interfaces 56*a, b*, and *c* are not shown as including a touch screen, it will be understood that patient support apparatus 20 of FIG. 2 can be modified to include one or more touch screens associated with any one or more of user interfaces 56*a*, 56*b*, and/or 56*c*.

Lifts 36 are adapted to raise and lower litter frame 38 with respect to base 34 Lifts 36 may be hydraulic actuators, electric actuators, or any other suitable device for raising and lowering litter frame 38 with respect to base 34. In the illustrated embodiment, lifts 36 are operable independently so that the tilting of litter frame 38 with respect to base 34 can also be adjusted. That is, litter frame 38 includes a head end 48 and a foot end 50, each of whose height can be independently adjusted by the nearest lift 36. This allows patient support apparatus 20 to move to both a Trendelenburg position and a reverse Trendelenburg position. Patient support apparatus 20 is designed so that when an occupant lies thereon, his or her head will be positioned adjacent head end 48 and his or her feet will be positioned adjacent foot end 50. The control of lifts 36 is carried out via one or more of the user interfaces 56*a*, 56*b*, and 56*c*.

Litter frame 38 provides a structure for supporting support deck 40, headboard 42, footboard 44, and siderails 46. Support deck 40 provides a support surface for a mattress 52, or other soft cushion, so that a person may lie and/or sit thereon. The top surface of the mattress or other cushion forms a support surface for the occupant. Support deck 40 is made of a plurality of sections, some of which are pivotable about generally horizontal pivot axes. In the embodiment shown in FIG. 2, support deck 40 includes a head section, a seat section, a thigh section, and a foot section. The head section, which is also sometimes referred to as a Fowler section, is pivotable about a generally horizontal pivot axis between a generally horizontal orientation (not shown in FIG. 2) and a plurality of raised positions (one of which is shown in FIG. 2). The thigh section and foot section may also be pivotable about generally horizontal pivot axes. The pivoting of the various sections of deck 40 is controlled via one or more of user interfaces 56*a*, 56*b*, and 56*c*.

Figure 3:
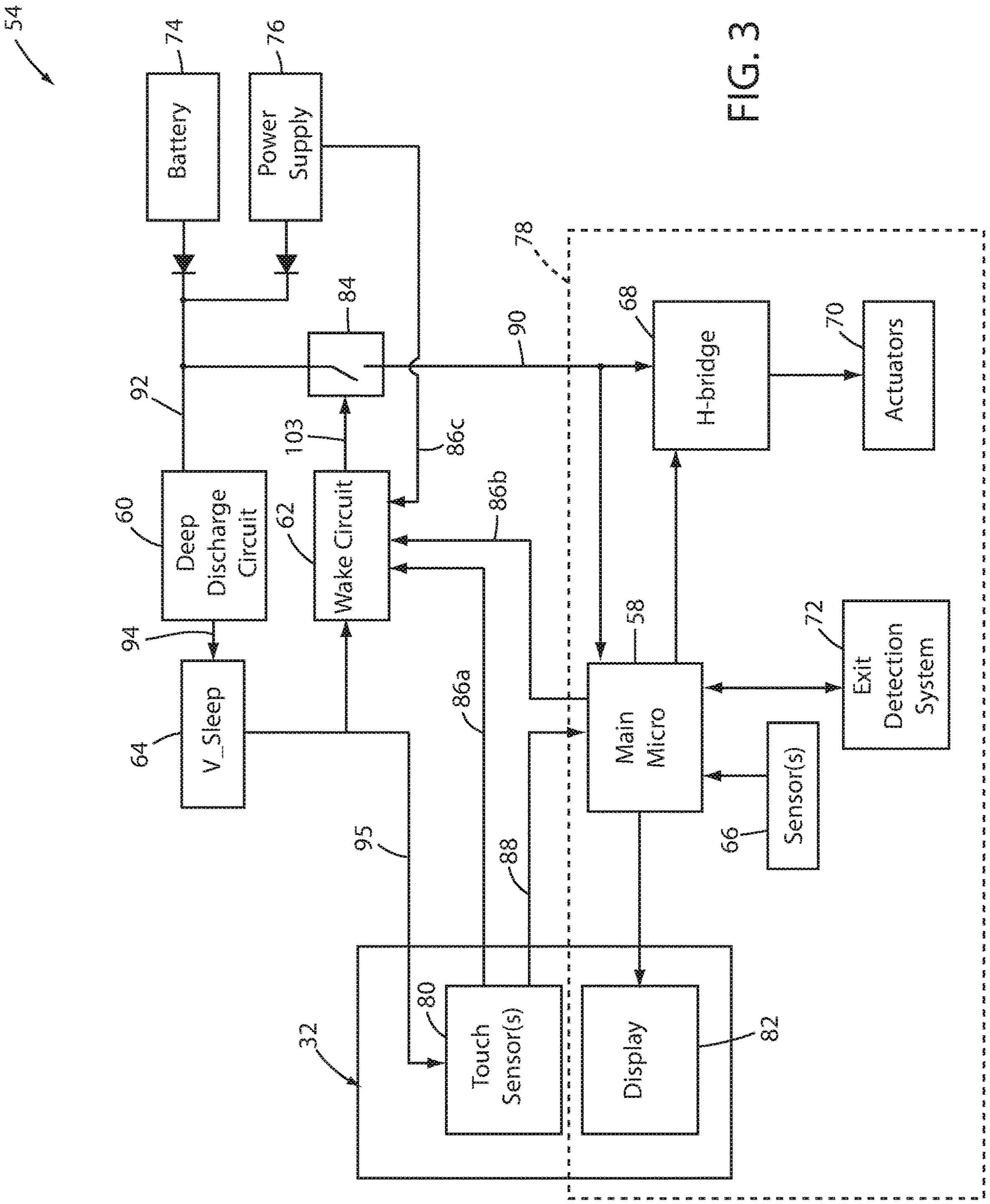
FIG. 3 is a diagram of a first embodiment of a control system usable on any of the patient support apparatuses described herein, including those shown in FIGS. 1 and 2.

The mechanical construction of patient support apparatus 20 of FIG. 3 is the same as, or nearly the same as, the mechanical construction of the Model FL27 InTouch® critical care bed manufactured and sold by Stryker Corporation of Kalamazoo, Michigan. This mechanical construction is described in greater detail in the Stryker Maintenance Manual (version 2.4; 2131-409-002 Rev. B) for the Model FL27 InTouch® Critical Care Bed, published in 2010 by Stryker Corporation of Kalamazoo, Michigan, the complete disclosure of which is incorporated herein by reference. In other embodiments, the mechanical construction of patient support apparatus 20, when implemented as a bed, may be the same as, or include elements of, the Model 3002 S3 bed manufactured and sold by Stryker Corporation of Kalamazoo, Michigan. This mechanical construction is described in greater detail in the Stryker Maintenance Manual (3006-109-002 Rev. D) for the MedSurg Bed, Model 3002 S3, published in 2010 by Stryker Corporation of Kalamazoo, Michigan, the complete disclosure of which is also incorporated herein by reference. It will be understood by those skilled in the art that patient support apparatus 20, when implemented as a bed, can be designed with other types of mechanical constructions, such as, but not limited to, those described in commonly assigned, U.S. Pat. No. 7,690,059 issued to Lemire et al., and entitled HOSPITAL BED; and/or commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the complete disclosures of both of which are also hereby incorporated herein by reference. The mechanical construction of patient support apparatus 20 may also take on forms different from what is disclosed in the aforementioned references, including, as noted, being implemented as structures other than beds.

Regardless of whether patient support apparatus 20 is implemented as a recliner, a bed, or some other type of patient support structure, FIG. 3 illustrates a control system 54 that is usable with the patient support apparatus 20, whatever its particular physical implementation. Control system 54 includes a main controller 58, a deep discharge circuit 60, a wake circuit 62, a sleep power supply 64, one or more sensors 66, and one or more H-bridges 68 for controlling and powering one or more actuators 70, such as, but not limited to, one or more motors. Control system 54 also includes one or more touch screens 32. In the embodiment shown in FIG. 3, touch screen 32 includes both a set of touch sensors 80 and a display 82. In some embodiments, such as that shown in FIG. 3, control system 54 also includes an exit detection system 72.

Exit detection system 72, when armed, is adapted to issue an alert (audio and/or visual; and local and/or remote) when it detects that an occupant of patient support apparatus 20 may be about to, or already has, exited from patient support apparatus 20. In some embodiments, exit detection system 72 may take on any of the forms, and include any of the features, of those exit detection systems described in commonly assigned U.S. Pat. No. 5,276,432 issued to Travis and entitled PATIENT EXIT DETECTION MECHANISM FOR HOSPITAL BED; or commonly assigned U.S. patent application Ser. No. 14/212,367 filed Mar. 14, 2014 by inventors Michael Joseph Hayes et al. and entitled PATIENT SUPPORT APPARATUS WITH PATIENT INFORMATION SENSORS; commonly assigned U.S. patent application Ser. No. 62/065,242 filed Oct. 17, 2014 by inventors Marko N. Kostic et al. and entitled PERSON SUPPORT APPARATUS WITH MOTION MONITORING; commonly assigned U.S. patent application Ser. No. 61/989,243 filed May 6, 2014 by inventors Marko N. Kostic et al. and entitled PERSON SUPPORT APPARATUS WITH POSITION MONITORING; or commonly assigned U.S. patent application Ser. No. 62/076,005 filed Nov. 6, 2014 by inventors Marko N. Kostic et al. and entitled EXIT DETECTION SYSTEM WITH COMPENSATION, the complete disclosure of all of which are incorporated herein by reference.

Power for control system 54 is supplied either by a battery 74 or a non-battery power supply 76. Non-battery power supply 76, in at least one embodiment, refers to the electrical power supplied by an electrical cord that is coupled to an alternating current (A/C) wall outlet. In other words, power supply 76 refers to the mains electricity, in at least one embodiment. Battery 74 may take on any of a variety of different suitable forms, depending upon the particular implementation of patient support apparatus 20 and the functions that are to be carried out by control system 54. In some embodiments battery 74 is a lead-acid battery, while in other embodiments battery 74 is any one of a lithium-ion battery, a nickel-cadmium battery, a nickel-metal hydride battery, a nickel-zinc battery, or still other types of batteries. In most embodiments, battery 74 is rechargeable, but this is not necessarily the case in all embodiments.

Control system 54 (FIG. 3) is adapted, in at least one embodiment, to selectively supply power to a set of sleep components 78. Sleep components 78 are components of patient support apparatus 20 that are able to be put to sleep and awakened. That is, in at least one embodiment, control system 54 selectively puts sleep components 78 into a sleep state and awakens sleep components 78 into an awake state. When operating in the sleep state, control system 54 stops supplying power to sleep components 78, and when operating in the awake state, control system 54 re-supplies electrical power to sleep components 78. As shown more clearly in FIG. 3, sleep components 78 include main controller 58, H-bridge 68, actuator 70, display 82 of touch screen 32, and, if present, sensors 66 and/or exit detection system 72.

The logic for determining whether or not sleep components 78 will be put into a sleep state or an awake state is carried out by wake circuit 62 and controller 58. More specifically, wake circuit 62 determines when to change sleep components 78 from the sleep state to the awake state, and main controller 58 determines when to change sleep components 78 from the awake state to the sleep state. Because main controller 58 is part of the set of sleep components 78, it will not receive any electrical power when sleep components 78 are in the sleep state. As a result, main controller 58 does not play any role in awakening from the sleep state to the awake state. Instead, the transitioning into the awake state is carried out by wake circuit 62 and various other components that are not part of sleep components 78. As will be discussed in greater detail below, the electrical components that are responsible for carrying out the transition from the sleep state to the awake state are all comprised of hardware (no instruction executing components). As a result of this design feature, as well as other described below, control system 54 consumes substantially no power while in the sleep state, thereby more effectively conserving the power within battery 74.

Control system 54 is also designed to prevent battery 74 from being deeply discharged. That is, control system 54 is designed to prevent battery 74 from discharging beyond a threshold level. The specific value of the threshold may vary, depending upon the type of battery 74, the functions performed by battery 74, and/or the form in which patient support apparatus 20 is implemented. Although other thresholds may be used, in at least one embodiment, control system 54 is adapted to prevent battery 74 from discharging to a state of charge that is less than 20% of its full state of charge. Control system 54 does this via deep discharge circuit 60, as will be discussed in more detail below. When deep discharge circuit 60 determines that the state of charge of battery 74 is less than the threshold, it cuts off power to all electrical components of patient support apparatus 20 (including itself). When power is shut off in this manner, patient support apparatus 20 can only regain electrical power by plugging its electrical cord back into a mains electrical supply, or otherwise providing electrical power via non-battery power supply 76.

A more detailed description of control system 54, including wake circuit 62 and deep discharge circuit 60, will now be provided. Wake circuit 62 (FIG. 3) controls a power switch 84 that, when closed, supplies power via a power line 90 to sleep components 78, and when open, terminates power to power line 90 and sleep components 78. Wake circuit 62 thus controls whether or not sleep components 78 are in the sleep state or the awake state via switch 84. Regardless of whether or not wake circuit 62 has switched sleep components 78 into a sleep state or an awake state, wake circuit 62 receives its own electrical power from sleep power supply 64. As will be explained more below, sleep power supply 64 provides electrical power regardless of whether or not sleep components 78 are awake or asleep. Sleep power supply 64 only stops supplying electrical power when deep discharge circuit 60 shuts off electrical power to all components (due to battery 74 having drained to its threshold, or below).

Wake circuit 62 includes three logic input lines 86. A first logic input line 86*a* comes from touch sensor 80; a second logic input line 86*b* comes from main controller 58, and a third logic input line 86*c* comes from power supply 76 (or more accurately, a sensor coupled to power supply 76 that detects the presence of power supply 76). Wake circuit 62 functions as a logical OR gate with respect to these three logic input lines 86*a, b*, and *c*. That is, if any of the inputs lines 86*a, b*, or *c* have a logic HIGH value, then wake circuit 62 will output a logic HIGH value that will close switch 84, thereby allowing electrical power to flow to sleep components 78 via power line 90. Only if all of the three logic input lines 86*a, b*, and *c* have a logic LOW value will wake circuit 62 open switch 84, thereby cutting off electrical power to all of sleep components 78 and thus putting those components into the sleep state.

Input line 86*a* has a logic HIGH value whenever a user touches touch screen 32. That is, whenever touch sensors 80 detect that a user has touched touch screen 32, touch sensor 80 outputs a logic HIGH value on input line 86*a*. Main controller 58 outputs a HIGH value on input line 86*b* whenever it detects activity at touch screen 32, and continues to output a HIGH value on input line 86*b* for a threshold amount of time after such activity is detected. More specifically, whenever touch sensor 80 detects a users touch, in addition to sending a logic HIGH value to wake circuit 62 via input line 86*a*, it also send a signal to main controller 58 via line 88. When main controller 58 receives this signal, it starts a timer. Main controller 58 continues to output a HIGH value to wake circuit 62 via input line 86*b* for as long as the timer continues to run. When the timer expires, controller 58 stops sending a HIGH signal along line 86*b* and instead switches line 86*b* to a logic LOW signal. Main controller 58 further resets the timer any time touch sensor 80 detects a person touching touch screen 32 (or touching any other controls that are part of the user interface), so long as the timer has not yet expired. In at least one embodiment, the timer is set to a value on the order of five minutes, although it will be understood that other threshold amounts of time may be used. Whatever its precise value, the use of the time threshold by controller 58 ensures that sleep components 78 will remain awake for at least the threshold amount of time after a user touches touch screen 32 (or other controls associated with the user interface).

Wake circuit 62 also receives logical input line 86*c*. Logical input line 86*c* is set to a logic HIGH value whenever power supply 76 is present. That is, whenever patient support apparatus 20 is plugged into an A/C mains outlet, logical input line 86*c* is set to HIGH. This ensures that sleep components 78 will never be put into the sleep state when patient support apparatus 20 is plugged into a functioning A/C wall outlet. Stated alternatively, control system 54 only puts sleep components 78 into the sleep state when it is functioning on battery power (and when no activity is detected at touch screen 32 for the threshold amount of time).

In summary, wake circuit 62 closes switch 84 whenever any of inputs 86*a, b*, or *c* has a logic HIGH value. The closing of switch 84 supplies power to main controller 58 and H-bridge 68 via power line 90. The remaining components with the set of sleep components 78 also receive their power via power line 90, although these connections are not illustrated in FIG. 3.

Deep discharge circuit 60, as noted previously, shuts down electrical power to all components of patient support apparatus 20 whenever the charge state of battery 74 falls below a voltage threshold. Deep discharge circuit 60 receives power from a power bus 92 that is operatively coupled to battery 74 and power supply 76. Deep discharge circuit 60 compares the voltage on power bus 92 to a threshold voltage level. If the voltage on power bus 92 is greater than the threshold voltage, then deep discharge circuit 60 supplies power to sleep power supply 64 via an electrical connection 94. Deep discharge circuit 60 supplies this power to sleep power supply 64 regardless of the sleep or awake state of sleep components 78. That is, power supply 64 supplies power to touch sensors 80 and wake circuit 62 via power line 95 when sleep components 78 are in the sleep state, and also when sleep components 78 are in the awake state. As a result of supplying power to touch sensor(s) 80, touch sensors 80 are able to detect a user touching touch screen 32 even when sleep components 78 are in the sleep state. Further, as a result of supplying power to wake circuit 62, wake circuit 62 receives the necessary power to control switch 84, even when sleep components 78 are in the sleep state.

When deep discharge circuit 60 detects that the voltage on power bus 92 has fallen below the threshold voltage, it stops supplying electrical power to sleep power supply 64. As a result of this power cut-off, wake circuit 62 and touch sensors 80 do not receive any electrical power. Further, when wake circuit 62 does not receive any power, it stops supplying a logical HIGH on its output 103 that is coupled to switch 84, thereby opening switch 84 and shutting off power to all of sleep components 78. Consequently, when deep discharge circuit 60 detects that power bus 92 has dropped below a threshold voltage level, electrical power is cut off to all of patient support apparatus 20. As noted, restoring power to patient support apparatus 20 is thereafter only possible by plugging the patient support apparatus 20 back into an electrical wall outlet (i.e. providing power supply 76), or by replacing battery 74 with a new battery that has a voltage above the threshold voltage used by deep discharge circuit 60.

Figure 4A:
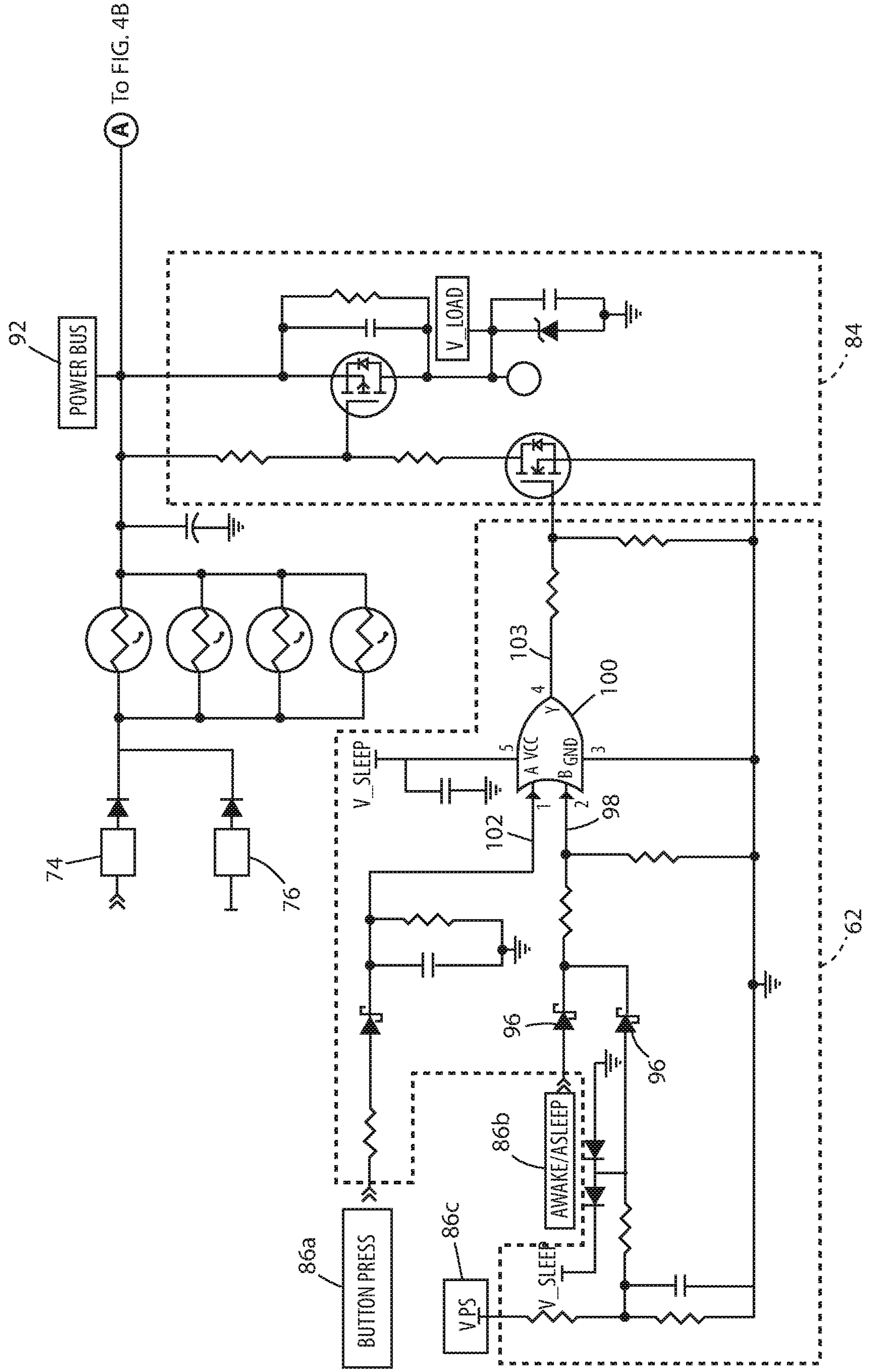
FIG. 4 is a detailed circuit diagram of portions of the control system of FIG. 3.
Figure 4B:
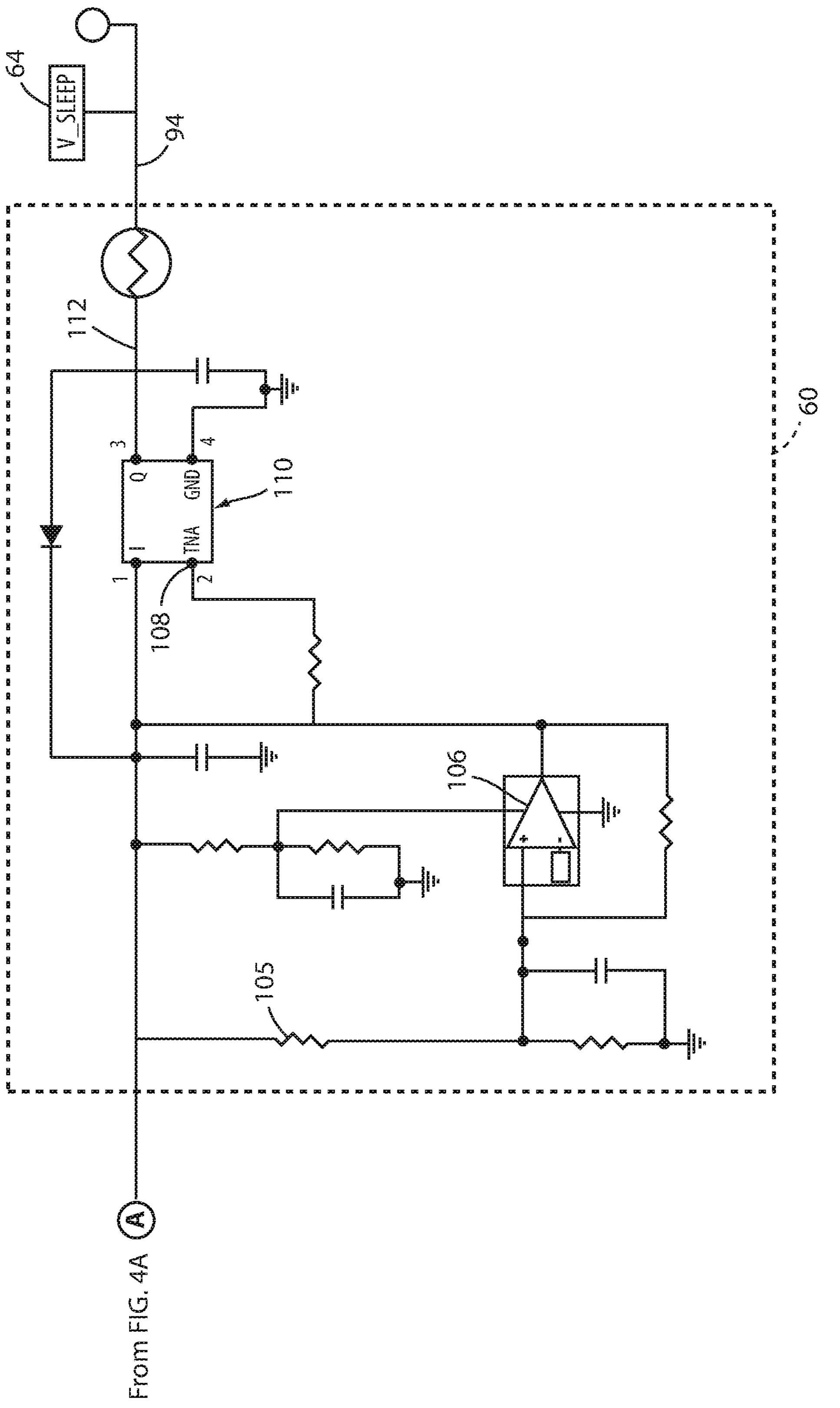

One detailed manner of implementing deep discharge circuit 60, wake circuit 62, and switch 84 is shown in FIG. 4. As can be seen therein, wake circuit 62 includes a pair of Zener diodes 96, one of which is coupled to input line 86*b* and the other of which is coupled to input line 86*c*. The outputs from the two Zener diodes 96 are coupled together to create a first input line 98 to an OR gate 100. The coupling of the outputs of the two Zener diodes together on line 98 has the effect of performing a logical OR operation on the inputs 86*b* and 86*c*. That is, if either of input lines 86*b* or 86*c* is logically HIGH, then line 98 will also be logically HIGH; and only if neither of the input lines 86*b* and 86*c* is logically HIGH will line 98 be logically LOW.

OR gate 100 also receives a second input 102 that is electrically coupled to input 86*a*. As a result, whenever input 86*a* is logically HIGH, second input 102 will also be logically HIGH, and whenever input 86*a* is logically LOW, second input 102 will also be logically LOW. The output 103 of OR gate 100 is fed to switch 84 and, as noted, closes switch 84 when it is logically HIGH and opens switch 84 when it is logically LOW.

In the embodiment illustrated in FIG. 4, switch 84 is comprised of first and second Metal Oxide Semiconducting Field Effect Transistors (MOSFETs) 104*a* and 104*b*. When OR gate 100 outputs a logic HIGH signal, first and second MOSFETs 104*a* and 104*b* allow power from power bus 92 to be supplied to power line 90 which, as discussed previously and shown in FIG. 3, provides power to all of sleep components 78. When OR gate 100 outputs a logic LOW signal, first and second MOSFETs 104*a* and 104*b* do not allow power from power bus 92 to be supplied to power line 90, thereby cutting off power to sleep components 78 and putting them into a sleep state.

Deep discharge circuit 60, which is shown to the right in FIG. 4, couples the power bus 92 input to a comparator 106 that compares a voltage supplied via power bus 92 to a threshold voltage. The threshold voltage is the voltage level that triggers a complete shutdown of electrical power to patient support apparatus. As noted, in some embodiments, the threshold voltage corresponds to approximately twenty percent of the voltage of battery 74 when it is fully charged. In other embodiments, a different threshold voltage is used. Regardless of its exact value, battery 74 provides the source of power for the threshold voltage. In this regard, it should be noted that the voltage compared to the threshold voltage by comparator 106 is not the actual voltage of power bus 92, but rather is a reduced voltage that is reduced by the presence of a resistor 105. Consequently, comparator 106 does not compare power bus 92's voltage directly to a threshold, but instead compares a reduced voltage value that is linearly dependent upon the voltage of power bus 92, to a threshold voltage.

The output of comparator 106 is fed into a control input 108 of a low drop fixed voltage regulator 110. Voltage regulator 110 is also coupled to power bus 92. So long as control input 108 receives a signal from comparator 106 indicative of the voltage level of power bus 92 being above the voltage threshold, voltage regulator 110 will output a fixed voltage on output 112. Output 112 is coupled to sleep power supply 64 and provides the electrical power to all of the electrical components of patient support apparatus that are not part of the set of sleep components 78.

In some embodiments, main controller 58 is configured to output a logic HIGH signal on line 86*b* based upon multiple factors. That is, in addition to running a timer based off of a user touching sensor 80, as discussed above, main controller 58 is configured in at least one embodiment to output a logic HIGH on line 86*b* if a user has activated exit detection system 72. By outputting a logic HIGH signal on line 86*b* when the exit detection system 72 is activated, controller 58 prevents patient support apparatus 20 from entering the sleep state when exit detection system 72 is armed. This outputting of a logic HIGH on line 86*b* occurs even if touch sensor 80 has not detected any touches for longer than the threshold amount of time (as measured by the timer). In still other embodiments, main controller 58 may be configured to take into consideration other factors when determining whether to output a logic HIGH or logic LOW signal on line 86*b*.

Controller 58 is constructed of any electrical component, or group of electrical components, that are capable of carrying out the functions described herein. In many embodiments, controller 58 is a conventional microcontroller, although not all such embodiments need include a microcontroller. In general, controller 58 includes any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controller 58 in carrying out the functions described herein, as well as the data necessary for carrying out these functions, are stored in a memory (not labeled) accessible to controller 58.

In some embodiments, touch screen 32 is constructed in one of the manners disclosed in commonly assigned U.S. patent application Ser. No. 62/166,354, filed May 26, 2015, by inventors Daniel Brosnan et al. and entitled USER INTERFACES FOR PATIENT CARE DEVICES, the complete disclosure of which is incorporated herein by reference. The touch screens disclosed in this application include dual sensing layers for sensing a users touch. In some embodiments, the dual layers include a resistive and a capacitive sensing layer. When such a dual sensing touch screen is incorporated into control system 54 of the present disclosure, one of the sensing technologies—such as, but not limited to, the capacitive sensing technology—may be included within sleep components 78, while the other of the sensing technology is excluded from the sleep components 78. In this manner, one of the sensing technologies still receives power while patient support apparatus 20 is asleep, thereby allowing patient support apparatus 20 to switch back to the awake state upon a user touching touch screen 32 (as sensed by the non-asleep sensing technology).

As can be seen from FIGS. 3 and 4, the electrical components used to change patient support apparatus 20 from the sleep state to the wake state are all hardware components. Main controller 58, which executes software, is one of the sleep components 78 and draws no power while in the sleep state. As a result of this, patient support apparatus 20 includes no instruction-executing components (e.g. microprocessors, microcontrollers, Systems-on-a-Chip (SoCs), etc.) that receive electrical power while in the sleep state. This helps reduce power consumption when patient support apparatus 20 is in the sleep state. Further, when touch sensors 80 are constructed as resistive sensors that effectively act as an open switch when no one is touching them (such as disclosed in the aforementioned patent application Ser. No. 62/166,354), patient support apparatus 20 consumes very little electrical power while in the sleep state, thereby conserving the energy of battery 74.

Although FIG. 3 illustrates a single touch screen 32, it will be understood that this is merely for illustrative purposes. For example, when patient support apparatus 20 is implemented as a recliner, such as shown in FIG. 1, it includes a first touch screen 32 positioned on a first side of the backrest 24 and a second touch screen 32 positioned on a second and opposite side of the backrest 24. Both of these touch screens 32 include touch sensors 80 that are powered by sleep power supply 64, and both of these touch screen 32 include a display 82 (e.g. an LCD display or a static set of backlit icons) that is part of the set of sleep components 78. Further, in this configuration, when a user touches either one of the touch screens 32 while patient support apparatus 20 is in the sleep state, this awakens all of the sleep components 78, including the display 82 of the other touch screen 32 that was not touched.

Still further, when patient support apparatus 20 is implemented as a recliner (FIG. 1), it may include one or more patient control panels positioned at locations that are convenient for the patient to use while seated on seat 22. One such location is on one or both of armrests 26. When such patient control panels are incorporated into patient support apparatus 20, they may be implemented as yet another touch screen 32, or they may be implemented in other manners, such as one or more dome switches. Regardless of their implementation, when a user touches the patient control panel, this is detected by wake circuit 62 and wakes up the patient support apparatus 20.

Still further, in some embodiments of patient support apparatus 20 that include one or more patient control panels, patient support apparatus 20 includes one or more lockout functions that can be activated by a caregiver from a caregiver control panel. When activated, these lockouts lock out one or more of the functions that are otherwise controllable using the patient control panel. In some of these embodiments, control system 54 is configured such that, if a patient touches a patient control panel in an attempt to activate a locked out function, this will not awaken patient support apparatus 20. In still other embodiments, the touching of a patient control panel in an attempt to activate a locked out function will awaken patient support apparatus 20, but will not result in the function being performed.

Figure 5:
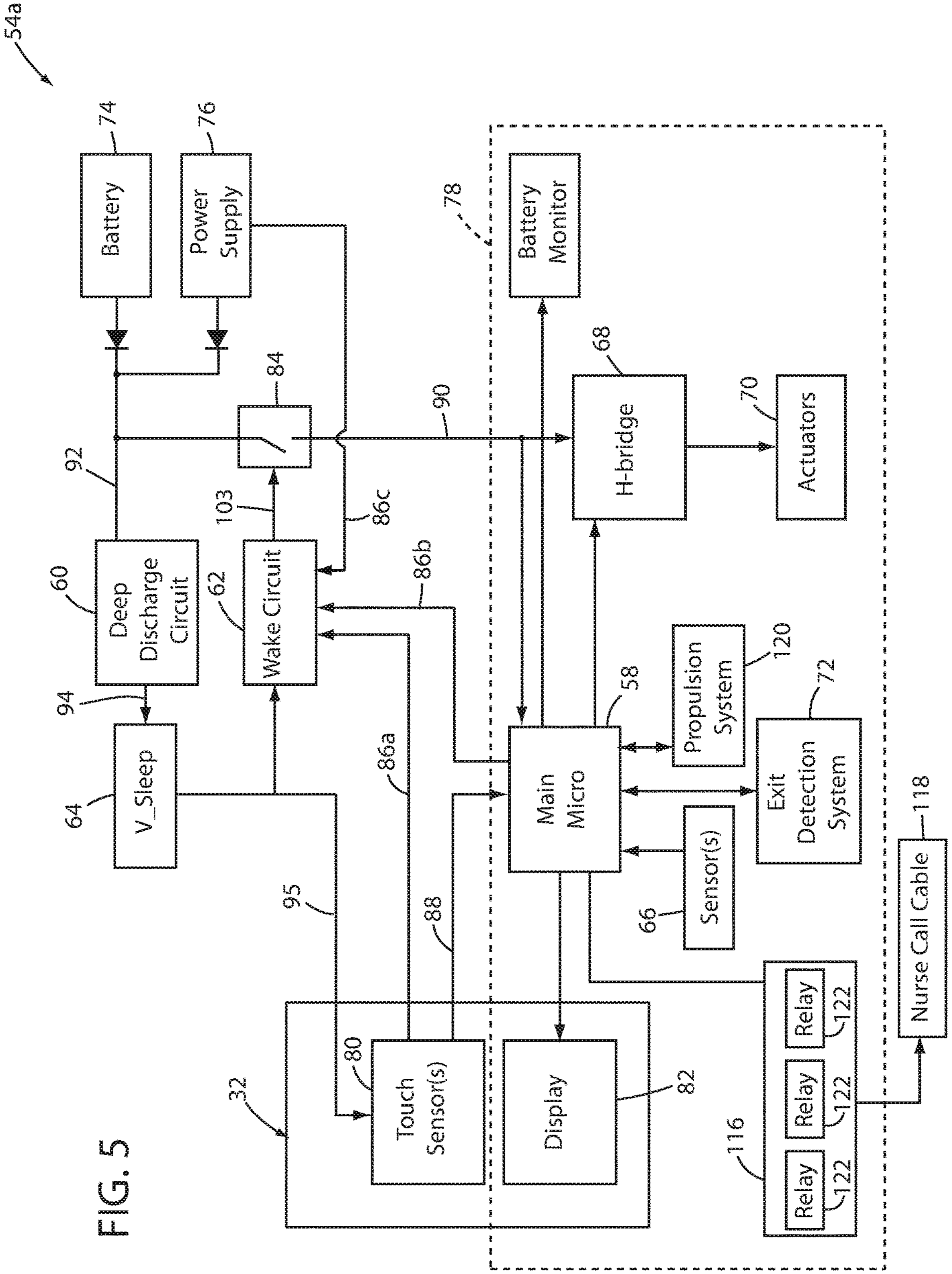
FIG. 5 is a second embodiment of a control system usable on any of the patient support apparatuses described herein.

FIG. 5 illustrates an alternative control system **54*a* that may be used with any of the patient support apparatuses described herein. Control system 54*a* includes many of the components that are the same as control system 54**. Those components that are the same and that operate in the same manner are given the same reference numbers and are not described further herein. Those components that are different are given a new reference number and described in more detail below.

Control system **54*a* differs from control system 54 in that it includes a battery monitor 114, a nurse call cable interface 116 adapted to couple to a nurse call cable 118, and a propulsion system 120. Battery monitor 114 is coupled to battery 74 and is adapted to take temperature, voltage, and current readings from battery 74. In at least one embodiment, battery monitor 114 includes a battery fuel gauge marketed by Texas Instruments of Dallas, Texas, such as any one or more of the bq27400 and/or bq27600 series of fuel gauges sold by Texas Instruments. In other embodiments, battery monitor 114 includes one or more comparable products manufactured by other semiconductor manufacturers. Regardless of the specific circuitry used, battery monitor 114 is configured to monitor a number parameters regarding battery 74**, such as, but not limited to, its state of charge, remaining capacity, full charge capacity, voltage, average current, temperature, current rate of discharge, time to empty at current rate of discharge, nominal available capacity, full available capacity, average time to empty, average time to full, maximum load current, maximum load time to empty, available energy, available power, time to empty at constant power, internal temperature, cycle count, state of health, charge voltage, charge current, passed charge, and/or other parameters.

Battery monitor 114 reports various information it gathers from the state of battery 74 to main controller 58. Main controller 58, in turn, displays some of this information on display 82. Main controller 58 also takes other actions in response to the battery information received from monitor 114. One such action includes changing the state of one or more relays 122 within nurse call cable interface 116. That is, controller 58 opens or closes one of more of the relays 122 based upon information it receives from monitor 114. Relays 122 are each in communication with nurse call cable 118. The opening or closing of relays 122 is therefore detected by a nurse call system within a healthcare facility when the other end of nurse call cable 118 is plugged into a nurse call outlet. In most cases, nurse call cable 118 includes a separate wire for each relay so that the nurse call system is able to separately detect the opening and closing of each relay 122.

In at least one embodiment, monitor 114 sends battery information to main controller 58 that is indicative that patient support apparatus 20 is in need of a new battery. Main controller 58, in turn, opens or closes one of relays 122. In this manner, the nurse call system is informed via cable 118 that patient support apparatus is in need of a new battery. The particular relay 122 that is opened or closed in response to patient support apparatus 20 needing a new battery may vary depending upon the particular nurse call system that patient support apparatus 20 is intended to be used with, as well as other factors. In at least one embodiment, main controller 58 changes the state of a first relay 122 when exit detection system 72 detects a patient exiting patient support apparatus 20, and changes the state of a second and different relay 122 when it determines that a new battery is needed.

In still another embodiment, if exit detection system 72 is initially armed while battery 74 is charged above a threshold, but then drops below a threshold while exit detection system 72 is still armed, controller 58 is adapted to change the state of the same relay (first relay) that it changes when it detects a patient exiting patient support apparatus. In this embodiment, the draining of a battery below the threshold results in an alert signal being transmitted to caregivers that is the same as if the patient had exited patient support apparatus 20. This ensures that caregivers are notified before an impending complete battery discharge, and allows them to take preventative action.

In still other embodiments, main controller 58 is adapted to change the state of one or more relays based upon other information received from monitor 114, and thereby inform the nurse call system of the state of battery 74. Such other information includes information indicating whether patient support apparatus 20 is in the sleep mode or the awake mode, information indicating that patient support apparatus 20 is about to enter the deep discharge prevention state and shut off its power via deep discharge circuit 60, and/or information indicating that the charge level of battery 74 has fallen below a specific threshold.

Figure 6:
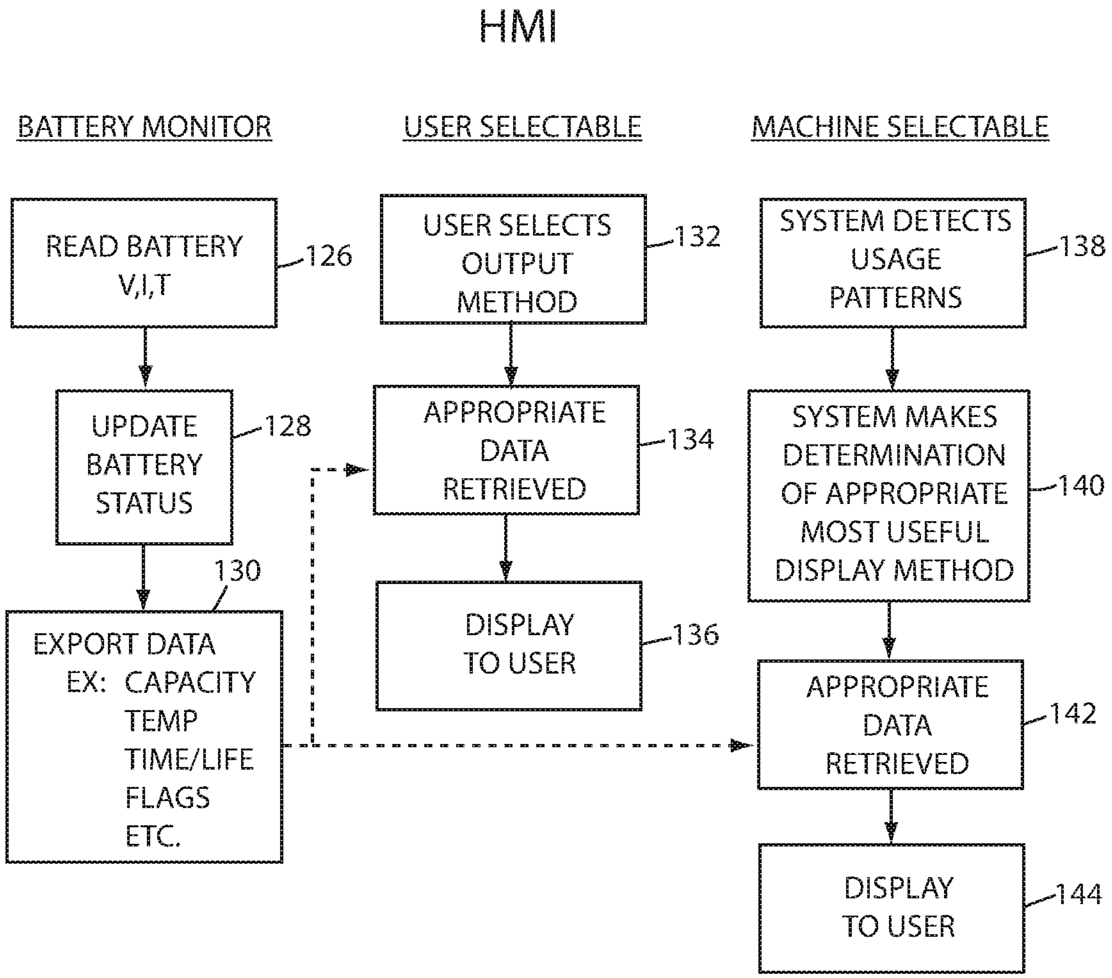
FIG. 6 is a flowchart of an automatic and/or manually selectable battery data display algorithm that may be incorporated into any of the patient support apparatuses described herein.

In addition to, or in lieu of, sending battery information to a nurse call system via relays 122 and nurse call cable 118, main controller 58 is also configured to provide improved and easily understood information regarding the state of the battery to users via display 82. In at least one embodiment, control system **54*a* provides battery information to a user according to a battery monitoring algorithm 124 that is illustrated in more detail in FIG. 6. As will be discussed in greater detail below, battery monitoring algorithm displays on display 82, or another display, battery status information that is selectable by a user and/or battery status information that is automatically determined by control system 54***a* based upon the state, history, and/or other factors of patient support apparatus 20.

Battery monitoring algorithm 124 begins at step 126 where battery monitor 114 reads the voltage, current, and temperature of battery 74. Battery monitor 114 then proceeds to step 128 where it updates the various parameters measured and recorded by monitor 114 utilizing the latest voltage, current, and temperature readings taken at step 128. At step 130, monitor 114 exports various battery status data to main controller 58. The exported data may include a variety of different parameters, such as, but not limited to, the battery's current capacity, remaining capacity, temperature, time left until discharge, any flags or warnings regarding battery 74, and/or other battery status data.

The data exported from monitor 114 at step 130 is received by main controller 58 at steps 134 and 142. When main controller 58 receives the data at step 134, it proceeds to display some or all of the received data on display 82 at step 136. The data displayed by controller 58 at step 136 is determined based upon a user's selection of what data to display that is made during a previous step 132. That is, at step 132, a user configures patient support apparatus 20 to display battery status data that is selected by the user. Control system 54*a* may be configured to allow a user to also display the selected battery status data in different manners, such as using different graphics. This selection is also input into system 54*a* at step 132. Step 132 is carried out, in at least one embodiment, by via touch screen 32. That is, a user uses touch screen 32 to select what battery data status he or she would like displayed, what format or graphics to use in displaying that data, and/or when to display that data. Once the user's selections are made at step 132, main controller 58 records these selections and uses them to display the selected battery status data at step 136, as received and/or updated at step 134.

Battery monitoring algorithm 124 is also configured to automatically display certain battery status data based upon the usage, state, and/or history of patient support apparatus 20. This automatic selection of battery status data to display is carried out in steps 138 through 144 of algorithm 124. At step 138, main controller 58 determines how patient support apparatus 20 is being used. This determination includes any one or more of a number of different aspects. In some embodiments, control system 54*a* determines when any motors or actuators of patient support apparatus 20 are currently being used. In some embodiments, control system 54*a* specifically determines whether actuators that are used to lift a patient, such as those present on a cot for lifting a patient from a low height to a higher height, are being used. In those embodiments where patient support apparatus 20 includes an exit detection system 72 and/or a propulsion system 120, controller 58 determines whether these systems are in used at step 138. Controller 58 may also determine whether still other systems, components, and/or functions are currently being used by patient support apparatus at step 138.

After determining the current electrical usage state of patient support apparatus 20 at step 138, controller 58 moves onto step 140 where it automatically selects what battery status data to display, and what format to display the data in, based upon the determination made at step 138. This step is discussed in more detail with respect to the various exemplary graphics illustrated in FIGS. 7A through 9E. Once main controller 58 has selected the data to display and its format, it proceeds to receive the data to display at step 142 from monitor 114. Thereafter, it displays the selected and received data at step 144 on display 82 and/or on one or more other displays.

Figure 7A:
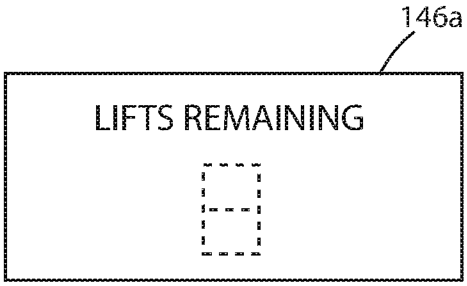
FIG. 7A is a first illustrative graphic for displaying battery data using the display algorithm of FIG. 6 for a patient support apparatus adapted to lift a patient, such as, but not limited to, a cot.
Figure 7B:
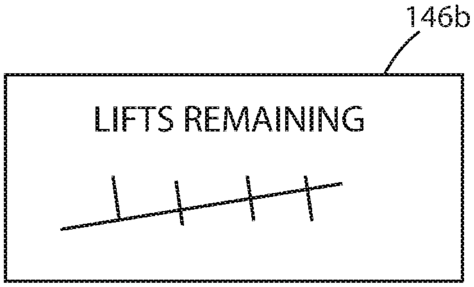
FIG. 7B is a second illustrative graphic for displaying battery data from the patient support apparatus of FIG. 7A.
Figure 7C:
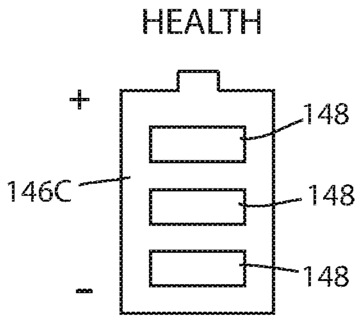
FIG. 7C is a third illustrative graphic for displaying battery data from the patient support apparatus of FIG. 7A.

FIGS. 7A-7C illustrate three different examples of graphics 146*a-c* that controller 58 may display on display 82, or another display, at step 136 and/or step 144 of algorithm 124. It will be understood that graphics 146*a-c*, as well as graphics 146*d-n* of FIGS. 8 and 9, are merely illustrative and non-exhaustive examples of the types of graphics that controller 58 can display. Modifications to these graphics can be made, and controller 58 can be changed to display still other graphics that are not shown in FIGS. 7-9.

The specific illustrative graphics 146*a-c* shown in FIGS. 7A-7C are particularly suited for use with a patient support apparatus 20 that is adapted to lift a patient, such as, but not limited to, a cot. Cots typically include one or more powered actuators that lift the patient from a low height to a high height. Often, the patient is first put on the cot when the cot is at a low height and the cot is then lifted while on the cot to a higher height. The cot is typically only transported once the patient has been lifted to the higher height. When control system 54*a* is implemented on a cot, or other patient support apparatus 20 having a patient lifting function, control system 54*a* displays one or more of graphics 146*a-c* on display 82. Graphics 146*a* and 146*b* illustrate two different manners of displaying the number of lifts that can still be performed by patient support apparatus 20 based upon the current state of battery 74. In some embodiments, this number is calculated by dividing the remaining capacity of battery 74 by an average amount of energy consumed during one or more previous lifts. In other embodiments, this number is calculated based upon other information derived from battery monitor 114 regarding the current state of battery 74.

Regardless of the precise manner in which the number of lifts in graphics 146*a* and 146*b* is calculated, the presentation of this number to the user of that particular patient support apparatus 20 provides the user with information about the status of battery 74 in a manner that is more useful than a simple indication of how far battery 74 has currently drained. That is, a user of that particular patient support apparatus 20 may not have any idea of how much battery drainage results from one lift of a typical patient, and therefore may decide to recharge battery 74 prior to its needing it, or may decide to continue to use battery 74 longer than it is able to lift a patient. Indicating to the user an estimated number of lifts left therefore provides a far more useful and appropriate indication of the charge state of battery 74, particularly for cots and other patient support apparatuses 20 where the primary battery drainage occurs due to patient lifting.

Graphic 146*c* provides additional information about the state of battery 74, and may be alternatively or additionally displayed on the display of the patient support apparatus 20 that displays graphics 146*a* and 146*b*. Graphic 146*c* provides an indication about the health of battery 74, such as, but not limited to, when battery 74 may need to be replaced. As can be seen in FIG. 7C, graphic 146*c* includes a plurality of bars 148 that are selectively illuminated (or whose illumination color is changed) based upon how healthy battery 74 is determined to be. When all of the bars are illuminated, or colored a first color, battery 74 is at is healthiest. As the health of battery 74 decreases, fewer and fewer bars 148 and/or portions of bars 148 are illuminated.

In some embodiments, the health of battery 74 that is displayed on graphic 146*c* is calculated based upon the current charge capacity of battery 74 versus the charge capacity of battery 74 when battery 74 was initially installed, or when battery 74 was new. In other words, in such embodiments, graphic 146*c* provides an indication of how much charge battery 74 can retain when fully charged as compared to how much charge battery 74 could retain when it was new. The greater the decrease in its charge capacity, the lower the health indicated by graphic 146*c*.

In other embodiments, graphic 146*c* is based upon a number of times battery 74 has been discharged and recharged. In still other embodiments, graphic 146*c* is based upon how long battery 74 has been installed patient support apparatus 20. In still other embodiments, graphic 146*c* is based upon a combination of factors, such as the current charge capacity of battery 74, the number of charge cycles it has undergone, and/or the amount of time it has been installed. Other factors or formulas may also be used to calculate a health estimate of battery 74, which is then displayed on display 82. Regardless of the manner in which the health is specifically calculated, graphic 146*c* is intended to convey information to a user about the overall health of battery 74 in an easily understood manner, and is not intended to convey how much charge remains on battery 74 for the current charge/discharge cycle. This latter information—how far battery 74 has currently discharged—may be displayed on display 82 in addition to the information provided by graphics 146*a, b*, and/or c. Thus, in at least some embodiments, patient support apparatus 20 displays both a charge state of battery 74 as well as its overall health. This gives the user information both about how much longer the battery will last until it needs to be recharged, as well as information about how much longer the battery will last until it needs to be replaced.

FIGS. 8A-8F illustrate examples of graphics 146*d-i* that are suited for use with a patient support apparatus 20 that does not have a primary function of lifting a patient, or that includes substantially more functionality beyond lifting a patient. In other words, graphics 146*d-i* are particularly suited for patient support apparatuses 20, such as beds, stretchers and/or recliners, rather than cots. It will be understood, however, that graphics 146*d-i* could be used on a cot, if desired. Controller 58 is adapted to display one or more of graphics 146*d-i* on display 82 when using algorithm 124, depending upon whether or not a user has chosen to display one of graphics 146*d-i* and/or whether control system 54*a* has determined that one or more of graphics 146*d-i* should be displayed based upon information determined at step 138.

Figure 8F:
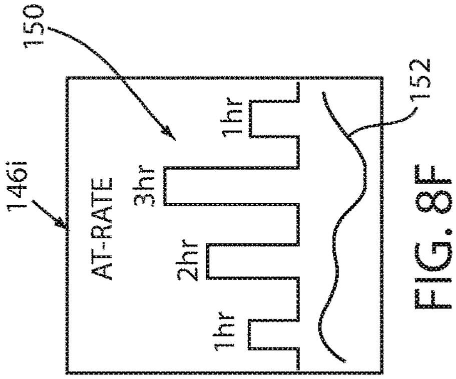
FIG. 8F is a sixth illustrative graphic for displaying battery data from the patient support apparatus of FIG. 8A.
Figure 8E:
FIG. 8E is a fifth illustrative graphic for displaying battery data from the patient support apparatus of FIG. 8A.
Figure 8D:
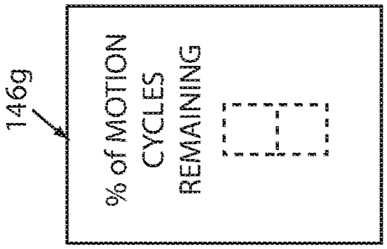
FIG. 8D is a fourth illustrative graphic for displaying battery data from the patient support apparatus of FIG. 8A.
Figure 8C:
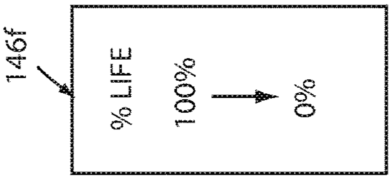
FIG. 8C is a third illustrative graphic for displaying battery data from the patient support apparatus of FIG. 8A.
Figure 8B:
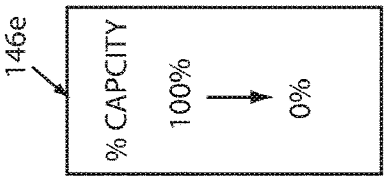
FIG. 8B is a second illustrative graphic for displaying battery data from the patient support apparatus of FIG. 8A.
Figure 8A:
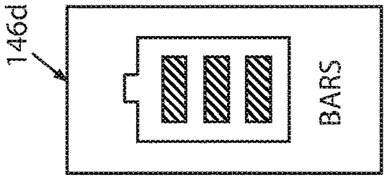
FIG. 8A is a first illustrative graphic for displaying battery data using the display algorithm of FIG. 6 for any of the patient support apparatuses described herein.
Figure 9A:
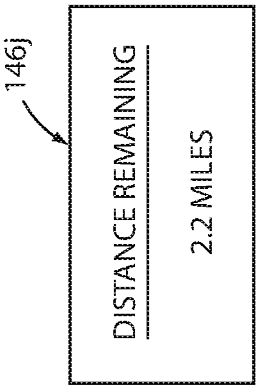
FIG. 9A is a first illustrative graphic for displaying battery data using the display algorithm of FIG. 6 for a patient support apparatus having a propulsion system.
Figure 9B:
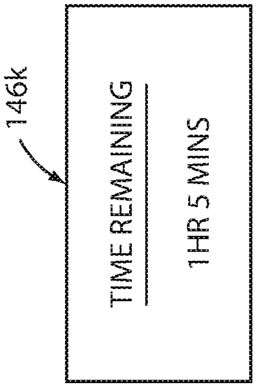
FIG. 9B is a second illustrative graphic for displaying battery data from the patient support apparatus of FIG. 9A.
Figure 9C:
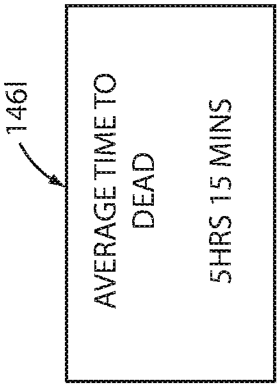
FIG. 9C is a third illustrative graphic for displaying battery data from the patient support apparatus of FIG. 9A.
Figure 9D:
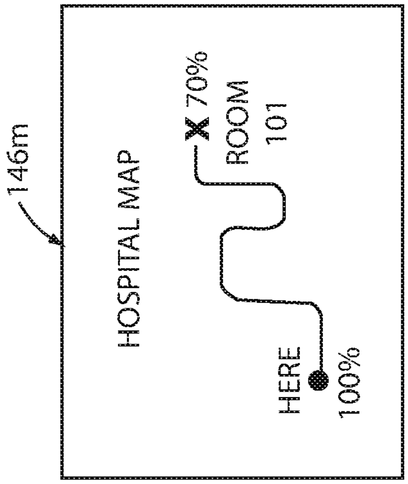
FIG. 9D is a fourth illustrative graphic for displaying battery data from the patient support apparatus of FIG. 9A.
Figure 9E:
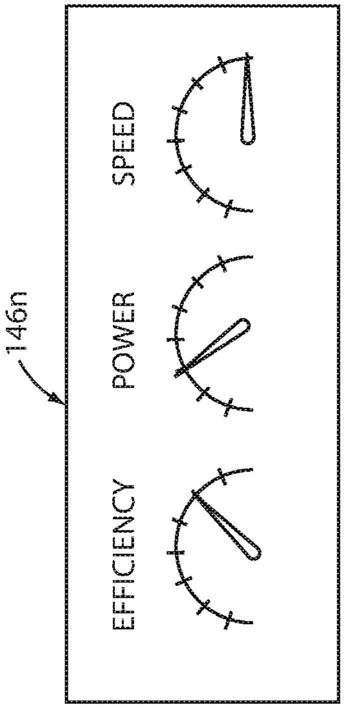
FIG. 9E is a fifth illustrative graphic for displaying battery data from the patient support apparatus of FIG. 9A.

Graphic 146*d* is similar to graphic 146*c* and provides a graphical indication of the remaining useful life of battery 74 before it should be, or needs to be, replaced. Graphic 146*e* provides an indication of the current charge state of battery 74. In other words, it provides an indication of how charged battery 74 currently is. As shown in the example of FIG. 8B, the indication is provided as a percentage. Graphic 146*f* similarly provides a percentage indication, but the percentage indication of graphic 146*f* is indicative of the overall remaining life of the battery, not the remaining charge left in the battery for this particular charge cycle (as is the case for graphic 146*e*).

Graphic 146*g* provides an indication of the number of motion cycles that can still be carried out by patient support apparatus 20 given the current charge state of battery 74. The precise definition of what constitutes a motion cycle will typically vary from patient support apparatus to patient support apparatus. When patient support apparatus 20 is implemented as a recliner, such as shown in FIG. 1, a motion cycle may refer to the changing of the orientation of backrest 24, seat 22, and leg rest 30 from one defined state to another, such as, for example, moving these components from an orientation that defines a Trendelenburg position to a sitting position, or from a sitting position to a stand-assist positioned, or from a flat position to a non-flat position, or in still other ways. Similar definitions of motion cycles may also be used when patient support apparatus 20 is implemented as a bed or stretcher. Still other definitions of motion cycles may also be used for beds, stretchers, cots, and/or recliners.

Graphic 146*h* (FIG. 8E) provides an indication of the estimated amount of time that patient support apparatus 20 can continue to function before battery 74 goes dead. Graphic 146*h* may be generated based upon an averaging of the amount of energy drawn from battery 74 over some prior time period. Alternatively, graphic 146*h* may be generated and updated repeatedly based upon the current discharge rate of battery 74. As yet another alternative, graphic 146*h* may be generated based upon a combination of one or more of these factors.

Graphic 146*i*, like graphic 146*h*, provides an indication of the estimated amount of time that patient support apparatus 20 can continue to function before battery 74 goes dead. Graphic 146*i*, however, provides additional information about the state of battery 74. This additional information includes a display of the historical rates at which energy has been drained from battery 74, as well as a display of the historical amounts of time left on battery 74 before it was drained as determined according to the past drainage rates. More specifically, graphic 146*i* includes a bar chart 150 and a current graph 152. Bar chart 150 displays how long battery 74 has left for powering patient support apparatus. Bar chart 150 is arranged such that the rightmost bar indicates the current amount of time that battery 74 has left for powering patient support apparatus 20, while the bars to the left indicate the past amounts of time that battery 74 had for powering patient support apparatus 20.

Graph 152 indicates the current drain rate of battery 74 at its rightmost end, and previous drain rates of battery 74 to the left. Thus, as can be seen in FIG. 8F, patient support apparatus 20 is currently draining battery 74 at a higher rate than it was in an immediately preceding time period (the bar to the immediate left of the right-most bar), and that, as a consequence, patient support apparatus 20 can only be expected to operate for another hour before battery 74 is drained. In contrast, during the previous time period, battery 74 was drained at a lower rate, and had battery 74 continued to be drained at that lower rate, patient support apparatus 20 would have been expected to operate for another three hours before being completely drained. Additional past drain rates and estimated times until complete drainage are also provided in graphic 146*i*.

FIGS. 9A-9E illustrate examples of graphics 146*j-n* that are suited for use with a patient support apparatus 20 that includes a self-propulsion system, such as propulsion system 120. Propulsion system 120 includes one or more motors that are adapted to drive one or more wheels on patient support apparatus 20 so that a caregiver need only apply a small amount of force when moving patient support apparatus 20 from one location to another. In at least one embodiment, propulsion system 120 is constructed in any of the manners disclosed in commonly assigned U.S. Pat. No. 6,772,850 issued to Waters et al. on Jan. 21, 2000, and entitled POWER ASSISTED WHEELED CARRIAGE, the complete disclosure of which is hereby incorporated herein by reference. Still other types of propulsion systems 120 may be used with the patient support apparatuses 20 disclosed herein.

Controller 58 is adapted to display one or more of graphics 146*j-n* on display 82 when using algorithm 124, depending upon whether or not a user has chosen to display one of graphics 146*j-n* and/or whether control system 54*a* has determined that one or more of graphics 146*j-n* should be displayed based upon information determined at step 138. More particularly, in at least one embodiment, control system 54*a* is adapted to automatically display at least one of graphics 146*j-n* whenever propulsion system 120 is activated. The display of these one or more graphics 146*j-n* occurs at a location on patient support apparatus 20 adjacent to where the controls for propulsion system 120 are located so that the user of the propulsion system can see these graphics while operating propulsion system 120.

Graphic 146*j* provides an indication of how far patient support apparatus 20 can travel via propulsion system 120 given the current charge state of battery 74. Graphic 146*k* provides an indication of how much time the propulsion system 120 of patient support apparatus 20 can continue to operate before battery 74 is drained. The indication provided by graphic 146*k* is based upon the current drainage rate of battery 74. Graphic 146*l* provides an indication of an estimated amount of time that propulsion system 120 can continue to operate before battery 74 is drained. The time estimate provided in graphic 146*l* differs from the time estimate provided in graphic 146*k* in that the estimate for 146*l* is based upon past drainage rates of battery 74 that have been averaged over a certain amount of time, rather than the instantaneous, or near instantaneous, drainage rate that is used to calculate the time estimate in graphic 146*k*.

Graphic 146*m* includes a map 154 of a floorplan, or a portion of a floorplan, for the facility in which patient support apparatus 20 is currently located. Graphic 146*m* further displays on the map 154 a current location 156 of patient support apparatus 20, as well as one or more potential destinations 158. For each potential destination that is displayed, graphic 146*m* indicates an estimated amount of charge remaining on battery 74 should the user of patient support apparatus 20 utilize propulsion system 120 to move patient support apparatus 20 to that particular destination. This lets the user know which destinations are within range of patient support apparatus 20 given the current charge state of battery 74. When graphic 146*m* is used within a patient support apparatus 20, controller 58 includes map information within a memory on board patient support apparatus 20 that indicates distances between locations within the facility it is located in. It further includes data that is stored in memory that indicates the amount of battery drainage that is estimated to result from moving the patient support apparatus various distances. This latter data may be preprogrammed, or it may be generated by patient support apparatus 20 by recording drainage levels at the beginning and end of journeys that were undertaken utilizing propulsion system 120.

In some embodiments, controller 58 gathers information about its current location using one or more of the location determining methods disclosed in commonly assigned U.S. patent application Ser. No. 14/559,458 filed Dec. 3, 2014 by inventors Michael Hayes et al. and entitled PATIENT SUPPORT APPARATUS COMMUNICATION SYSTEMS, or commonly assigned U.S. patent application Ser. No. 62/145,276 filed Apr. 9, 2015 by inventors Michael Hayes et al. and entitled LOCATION DETECTION SYSTEMS AND METHODS; or commonly assigned U.S. Pat. No. 8,102,254 issued Jan. 25, 2012 to inventors David Becker et al. and entitled LOCATION DETECTION SYSTEM FOR PATIENT HANDLING DEVICE; the complete disclosures of which are all hereby incorporated herein by reference. In still other embodiments, other methods for determining the location of patient support apparatus 20 may be used.

In some alternative embodiments, graphic 146*m* is modified to identify a range on map 154 that indicates how far patient support apparatus 20 can travel via propulsion system 120, given its current charge state. In this alternative embodiment, graphic 146*m* does not need to identify individual potential destinations 158, but instead can superimpose a circle (or other geographic shape) over map 154 that indicates the boundaries to which propulsion system 120 can drive patient support apparatus 20 given its current charge state. Still further, in some embodiments, multiple circles (or other shapes) may be superimposed over map 154 wherein each circle (or other shape) indicates how far propulsion system 120 can drive patient support apparatus 20 until battery 74 reaches a specified level of discharge. Regardless of the number of circles or other shapes, controller 58 takes into consideration when constructing these shapes the locations of walls, hallways, and other obstacles or pathways (such as elevator locations) within the facility in which patient support apparatus 20 is located. Other variations for displaying map information and travel ranges are also possible.

Graphic 146*n* provides three different indicators regarding the current status of battery 74: an efficiency indicator 160, a power indicator 162, and a speed indicator 164. Efficiency indicator 160 provides an indication of how efficiently battery 74 is currently being used with respect to propulsion system 120. That is, in at least one embodiment, efficiency indicator 160 indicates how much of the battery's capacity can be delivered at the current discharge rate. In other embodiments, efficiency indicator 160 provides an indication of the distance that propulsion system 120 can propel patient support at the current drainage rate of battery 74.

Power indicator 162 provides an indication of how much power is currently being drawn from battery 74. Speed indicator 164 provides an indication of how fast patient support apparatus 20 is currently being propelled. All of the indicators 160, 162, and 164 are updated in substantially real time while propulsion system 120 is operating, thereby giving the operator real time information about the efficiency, power, and speed at which propulsion system 120 is currently propelling patient support apparatus 20.

Controller 58 is adapted, in at least one embodiment, to automatically select at step 140 of algorithm 124 one or more of the different graphics 146*a-n* described above and shown in FIGS. 7A-9E to be displayed on display 82, or elsewhere on patient support apparatus 20. As noted with respect to FIGS. 9A to 9E, controller 58 is adapted to automatically select at least one of graphics 146*j-n* whenever propulsion system 120 is activated. When propulsion system 120 is not activated, controller 58 is adapted to select one or more of the graphics shown in FIGS. 7A through 8F. In addition to those graphics 146 that are automatically selected by controller 58, patient support apparatus 20 may also display other graphics 146 that are selected by a user. The user is therefore provided with battery status information that is either chosen by the user, or that is automatically chosen by controller 58 in a manner that matches the chosen graphic to the current state of patient support apparatus 20 in a way that provides the user with more useful manners of indicating the battery status. In sum, controller 58 displays some battery status information in a state sensitive manner that better aligns the graphic with the particular state of patient support apparatus 20.

As mentioned, graphics 146 of FIGS. 7A through 9E are merely illustrative examples of some of the types of graphics that may be displayed on patient support apparatus 20.

In still other embodiments, control system 54*a* is adapted to operate with a patient care device that is not a patient support apparatus 20. For example, in at least one embodiment, control system 54*a* is adapted to control a patient temperature management system, such as those disclosed in commonly assigned U.S. patent application Ser. No. 14/282,383 filed May 20, 2014 by inventors Christopher J. Hopper et al. and entitled THERMAL CONTROL SYSTEM. When incorporated into such a patient temperature management system, control system 54*a* is adapted to display at least one graphic that provides an indication of how much longer the patient temperature control unit can continue to provide temperature control given the current charge state of battery 74.

In still other embodiments, control system 54*a* is modified to include one or more power conservation features that limit the function of patient support apparatus 20 prior to battery 74 reaching its fully drained state. In such embodiments, controller 58 is adapted to lock out certain functions of patient support apparatus 20 based upon information received from monitor 114. The locking out of these features occurs in accordance with the logic set forth in the following chart.

| | Power State | | | |
|---|---|---|---|---|
| | power supply 76 present | battery charge > 1$^{st}$ threshold | 2$^{nd}$ threshold < battery charge < 1$^{st}$ threshold | battery charge < 2$^{nd}$ threshold |
| Functionality | full functionality | full functionality | limited functionality | no functionality |

As shown in the left-most column of the chart above, whenever patient support apparatus 20 is plugged into a functional A/C wall unit, or otherwise being powered by a non-battery power supply 76, controller 58 provides full functionality of patient support apparatus 20 to a user. Similarly, as shown in the second column from the left above, whenever patient support apparatus 20 is operating on power supplied from battery 74, but battery 74 has a charge level above a first threshold, controller 58 provides full functionality of patient support apparatus 20 to a user. However, when the charge level of battery 74 falls below the first threshold, but remains above a second and lower threshold, controller 58 limits the functionality of patient support apparatus 20. Finally, as shown in the right-most column of the chart above, whenever the charge level of battery 74 drops below the second and lower threshold, all of the functionality of patient support apparatus 20 is cut off. In at least one embodiment, the second threshold is the same as the threshold used by deep discharge circuit 60, and the termination of all functions of patient support apparatus 20 is carried out by deep discharge circuit 60.

Controller 58 is adapted, in several embodiments, to limit the functionality of the actuators used to move the various sections of the patient support apparatus 20 (e.g. backrest 24, seat 22, and leg rest 30 when patient support apparatus 20 is a recliner, or the various sections of deck 40 when patient support apparatus 20 is a bed or stretcher). More specifically, in at least one embodiment, when the charge level of battery 74 falls below the first threshold but remains above the second threshold, controller 58 is adapted to prevent the patient support apparatus from moving to certain orientations and/or positions, but still allow the recliner to move to certain other orientation and/or other positions. For example, in one embodiment, controller 58 prevents the patient support apparatus 20 from moving to a Trendelenburg position or a reverse Trendelenburg position when the battery charge level is between the first and second thresholds, but still allows the patient support apparatus 20 to move out of either of these positions, as well as to move in other manners. In some embodiments, controller 58 also, or alternatively, prevents a user from raising the height of seat 22 or deck 40 when the charge level of battery 74 is between the first and second thresholds, but still allows the user to lower the height of seat 22 or deck 40 when the battery charge level is between the two thresholds. Controller 58 may also be adapted to prevent patient support apparatus 20 from changing the configuration of its patient support surface (e.g. the deck of a bed or stretcher; and the backrest, leg rest, and/or seat of a recliner) in any manner that is deemed to make egress more difficult for the patient, while still allowing the configuration to be changed to any configuration that is deemed to make egress easier for the patient.

By limiting the movement of patient support apparatus 20 when the battery charge level drops below the first threshold, controller 58 helps ensure that patient support apparatus 20 is not stuck in an unwanted configuration if battery 74 were to die. Such unwanted configurations are typically ones in which transferring the patient out of patient support apparatus 20 are difficult, more prone to falls, or both (e.g. the Trendelenburg position, the reverse Trendelenburg position, and/or any positions in which the seat area or patient support surface is not at its lowest height).

In some embodiments, controller 58 prevents exit detection system 72 from being armed when the charge level of battery 74 falls below the first threshold. This helps prevent the patient monitoring function provided by the exit detection system 72 from prematurely terminating due to battery 74 going dead.

In at least some other embodiments, controller 58 may be configured to utilize more than two thresholds when determining what functions of patient support apparatus 20 to limit. That is, in some embodiments, patient support apparatus 20 is adapted to limit a first set of functions when the battery drops below the first threshold, limit a second set of functions when the battery drops below a second lower threshold, and cut off all functions when the battery charge level drops below a third threshold that is even lower than the second threshold. When using three or more thresholds to limit the functions of patient support apparatus 20, controller 58 is configured in some embodiments to limit the movement functions at higher thresholds than one or more other functions that do not consume as much battery power as movement. For example, in at least one embodiment, controller 58 limits the movement of patient support apparatus 20 at a first threshold level while still providing the exit detection system 72 function, but turns off the exit detection system 72 function when the voltage level of battery 74 drops below a second and lower threshold. Only when the voltage level drops below a third and lowest threshold are all functions cut off. In still other embodiments, a first set of movement is cut off at a first threshold level and a second set of movement is cut off at a second and lower threshold voltage level. Still other variations are possible.

It will be understood by those skilled in the art that the functionality limiting carried out by controller 58 can be accomplished either separately or in combination with the sleep/awake states discussed above. That is, in some embodiments of patient support apparatus 20, control system 54 or 54*a* is adapted to switch between the sleep and wake states, but does not reduce the functionality of patient support apparatus 20 based upon the voltage level of battery 74 (other than cutting off all functionality at the threshold of deep discharge circuit 60). In other embodiments of patient support apparatus 20, control system 54*a* is adapted to limit the functionality of various components in any of the manners described above based upon the charge level of battery 74, but does not switch between asleep and awake states. In still other embodiments of patient support apparatus 20, control system 54*a* is adapted to both switch between asleep and awake states and limit the functionality of patient support apparatus 20 when the charge level of battery 74 falls below one or more thresholds.

Similarly, battery monitoring algorithm 124, discussed above, can be used alone in a patient support apparatus that does not include either the function limiting feature or the asleep/awake states, or it may be used in a patient support apparatus 20 that also includes either or both of the function limiting feature and the asleep/awake states.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles "a," "an," "the" or "said," is not to be construed as limiting the element to the singular.

What is claimed is:

1. A patient support apparatus comprising:
- a frame;
- a support surface supported by the frame and adapted to support a patient thereon;
- an actuator for moving at least a portion of the support surface;
- an exit detection system, the exit detection system adapted to issue an alert when the patient exits from the patient support apparatus and the exit detection system is armed;
- a battery adapted to power the actuator and the exit detection system; and
- a control system including a microcontroller for controlling the actuator and a voltage monitor for monitoring a voltage level of the battery, the microcontroller adapted to terminate power to the actuator if the voltage level of the battery drops below a first threshold but to maintain power to the exit detection system if the voltage level of the battery drops below the first threshold but remains above a second and lower threshold.

2. The patient support apparatus of claim 1 wherein the microcontroller is further adapted to terminate power to the exit detection system if the voltage level of the battery drops below the second threshold.

3. The patient support apparatus of claim 2 wherein the control system is further adapted to terminate power to the microcontroller if the voltage level of the battery drops below a third threshold lower than the second threshold, and to allow power to flow to the microcontroller if the voltage level of the battery is above the third threshold.

4. The patient support apparatus of claim 2 wherein the control system further includes a sleep circuit adapted to change the patient support apparatus from an awake state to a sleep state if the control system detects inactivity for more than a threshold amount of time and the exit detection system is not armed, the sleep state consuming less power than the awake state.

5. The patient support apparatus of claim 4 wherein the control system is adapted to terminate power to the microcontroller while the patient support apparatus is in the sleep state, and supply power to the microcontroller while the patient support apparatus is in the awake state.

6. The patient support apparatus of claim 4 further including circuitry adapted to awaken the patient support apparatus from the sleep state to the awake state, the circuitry being implemented completely in hardware and utilizing no software.

7. The patient support apparatus of claim 4 wherein the control system is adapted to continue to provide power to the voltage monitor while in the sleep state.

8. The patient support apparatus of claim 7 wherein the control system is adapted to terminate power to the microcontroller using only hardware and not software.

9. The patient support apparatus of claim 2 wherein the control system is adapted to shut off power to all electrical components of the patient support apparatus when the voltage monitor detects that the voltage level of the battery has fallen below a third threshold lower than the second threshold and the patient support apparatus is not plugged into an electrical power outlet.

10. A patient support apparatus comprising:
- a frame;
- a support surface supported by the frame and adapted to support a patient thereon;
- an actuator for moving at least a portion of the support surface;
- a user interface including a control for controlling a function of the patient support apparatus;
- a battery adapted to power the actuator and the user interface; and
- a control system including a voltage monitor, a microcontroller, and a wake circuit; wherein the voltage monitor is adapted to monitor a voltage level of the battery; the microcontroller is adapted to control the actuator and, when operating on power from the battery, to terminate power to itself in response to a trigger; and the wake circuit is adapted to re-supply power to the microcontroller in response to the control being activated.

11. The patient support apparatus of claim 10 wherein the trigger is the user interface not being used for a predetermined amount of time.

12. The patient support apparatus of claim 10 wherein the control system is further adapted to terminate power to the user interface if the voltage level of the battery drops below the threshold.

13. The patient support apparatus of claim 12 wherein the control system further includes a sleep circuit adapted to change the patient support apparatus from an awake state to a sleep state if the control system detects inactivity for more than a threshold amount of time, the sleep state consuming less power than the awake state.

14. The patient support apparatus of claim 13 wherein the control system is adapted to terminate power to the microcontroller while the patient support apparatus is in the sleep state, and supply power to the microcontroller while the patient support apparatus is in the awake state provided the voltage level of the battery exceeds the threshold.

15. The patient support apparatus of claim 13 wherein the wake circuitry is implemented completely in hardware and utilizes no software.

16. The patient support apparatus of claim 13 wherein the control system is adapted to continue to provide power to the voltage monitor while in the sleep state.

17. The patient support apparatus of claim 16 wherein the control system is adapted to terminate power to the microcontroller using only hardware and not software.

18. The patient support apparatus of claim 12 wherein the control system is adapted to shut off power to all electrical components of the patient support apparatus when the voltage monitor detects that the voltage level of the battery has fallen below a second threshold lower than the threshold and the patient support apparatus is not plugged into an electrical power outlet.

19. The patient support apparatus of claim 18 wherein the control system is adapted to turn on power to at least some of the electrical components of the patient support apparatus only when the patient support apparatus receives electrical power having a voltage greater than the threshold.

20. The patient support apparatus of claim 12 wherein the control system is adapted to continue to supply power to the wake circuit while the battery is below the threshold but above a second threshold.

* * * * *